(12) United States Patent
Miyake et al.

(10) Patent No.: US 11,760,668 B2
(45) Date of Patent: Sep. 19, 2023

(54) WATER TREATMENT METHOD AND WATER TREATMENT DEVICE

(71) Applicant: ORGANO CORPORATION, Tokyo (JP)

(72) Inventors: Masaki Miyake, Tokyo (JP); Yoshiaki Hasebe, Tokyo (JP); Shohei Yamamoto, Tokyo (JP); Hizuru Wakayama, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 165 days.

(21) Appl. No.: 17/263,644

(22) PCT Filed: Jul. 24, 2019

(86) PCT No.: PCT/JP2019/029086
§ 371 (c)(1),
(2) Date: Jan. 27, 2021

(87) PCT Pub. No.: WO2020/026924
PCT Pub. Date: Feb. 6, 2020

(65) Prior Publication Data
US 2021/0284556 A1  Sep. 16, 2021

(30) Foreign Application Priority Data

Jul. 31, 2018 (JP) .................................. 2018-144034
Jul. 31, 2018 (JP) .................................. 2018-144035
Jul. 17, 2019 (JP) .................................. 2019-132107

(51) Int. Cl.
*C02F 3/12* (2023.01)
*C02F 3/28* (2023.01)

(52) U.S. Cl.
CPC .............. *C02F 3/1236* (2013.01); *C02F 3/28* (2013.01); *C02F 2203/006* (2013.01); *C02F 2209/005* (2013.01); *C02F 2209/40* (2013.01)

(58) Field of Classification Search
CPC .... C02F 3/1263; C02F 3/28; C02F 2203/006; C02F 2203/00; C02F 2209/40
(Continued)

(56) References Cited

U.S. PATENT DOCUMENTS

2006/0032815 A1    2/2006  Van Loosdrecht et al.
2007/0181493 A1*   8/2007  Cote .................... C02F 3/1215
                                                        210/906
(Continued)

FOREIGN PATENT DOCUMENTS

CN    107531525 A      1/2018
CN    107935171 A  *   4/2018  .............. C02F 3/085
(Continued)

OTHER PUBLICATIONS

Office Action issued in corresponding Japanese Patent Application No. 2018-144034 dated Apr. 5, 2022, along with English translation thereof.
(Continued)

*Primary Examiner* — Claire A Norris
(74) *Attorney, Agent, or Firm* — GREENBLUM & BERNSTEIN, P.L.C.

(57) ABSTRACT

A water treatment method that uses a reaction tank and involves repeatedly performing an operation cycle including: an inflow step for causing an inflow of waste water; a biological treatment step for subjecting the waste water to biological treatment using biological sludge; a sedimentation step for causing the biological sludge to settle; and a drainage step for draining biologically-treated water that has undergone the aforementioned biological treatment. The
(Continued)

reaction tank is provided with an inflow port that is disposed at a position lower than an interface position of a biological sludge bed formed at the bottom of the reaction tank in the sedimentation step, and an inflow pipe that extends upward in the vertical direction from the inflow port. In the inflow step, the waste water is caused to gravitationally flow down in the inflow pipe so as to be fed into the biological sludge bed from the inflow port.

14 Claims, 29 Drawing Sheets

(58) Field of Classification Search
USPC .................................................. 210/601, 620
See application file for complete search history.

(56) References Cited

U.S. PATENT DOCUMENTS

| | | |
|---|---|---|
| 2009/0101573 A1 | 4/2009 | Yamasaki et al. |
| 2018/0339925 A1 | 11/2018 | Miyake et al. |
| 2019/0023594 A1 | 1/2019 | Matsuda et al. |

FOREIGN PATENT DOCUMENTS

| | | | |
|---|---|---|---|
| JP | 62-149399 A | | 7/1987 |
| JP | 9-150181 A | | 6/1997 |
| JP | 10-066993 A | | 3/1998 |
| JP | 2005-262016 A | | 9/2005 |
| JP | 2006-281194 A | | 10/2006 |
| JP | 2008-036514 A | | 2/2008 |
| JP | 2008-212878 A | | 9/2008 |
| JP | 4804888 B2 | | 11/2011 |
| JP | 4975541 B2 | | 7/2012 |
| JP | 2016-77931 A | | 5/2016 |
| JP | 2016-193388 A | | 11/2016 |
| JP | 2016193388 A | * | 11/2016 |
| JP | 2017-124355 A | | 7/2017 |
| WO | 2004/024638 A1 | | 3/2004 |

OTHER PUBLICATIONS

Office Action issued in Chinese Patent Application No. 201980048786.5 dated Jun. 2, 2022, along with English translation thereorf.
International Search Report issued in International Patent Application No. PCT/JP2019/029086, dated Oct. 15, 2019, along with English Translation thereof.
Written Opinion of the International Searching Authority issued in International Patent Application No. PCT/JP2019/029086, dated Oct. 15, 2019, along with English Translation thereof.
Notification Concerning Transmittal of International Preliminary Report of Patentability issued in International Patent Application No. PCT/JP2019/029086, dated Feb. 11, 2021, along with English Translation thereof.
Notice of Reasons for Refusal issued in Japanese Patent Application No. 2019-132107 dated Jan. 24, 2023, along with English translation thereof.

* cited by examiner

WATER TREATMENT METHOD AND WATER TREATMENT DEVICE

TECHNICAL FIELD

The present invention relates to technology for a water treatment method and a water treatment device.

BACKGROUND

Conventionally, biological wastewater treatment has employed an activated sludge method that utilizes an aggregate of microorganisms (an aerobic biological sludge) known as a floc. However, in the activated sludge method, when the floc (aerobic biological sludge) and the treated water are separated in a settling pond, because the settling rate of the floc is slow, the surface area of the settling pond sometimes needs to be made very large. Further, the treatment speed in the activated sludge method is dependent on the sludge concentration inside the biological treatment tank, and although the treatment speed can be increased by increasing the sludge concentration, the occurrence of solid-liquid separation obstacles such as bulking can sometimes make it difficult to maintain treatment.

On the other hand, in an anaerobic biological treatment, aggregates composed of finely aggregated particles of microorganisms known as granules are generally used. Granules have extremely fast settling rates, and because the microorganisms are finely packed, the sludge concentration in the biological treatment tank can be increased, and a high-speed treatment of the wastewater can be achieved. However, anaerobic biological treatments sometimes suffer problems, including restrictions on the types of wastewaters that can be treated compared with aerobic treatments (such as the activated sludge method), and the requirement to hold the temperature of the treatment water at about 30 to 35° C. Further, if an anaerobic biological treatment is used alone, then the water quality of the treated water tends to be poor, and in those cases where the treated water is discharged into a river or the like, a separate aerobic treatment using an activated sludge method or the like is sometimes required.

In recent years, it has become clear that by using a semibatch treatment device in which the wastewater is introduced intermittently into the reaction tank, granulated biological sludges having superior settling properties can be formed not only with anaerobic biological sludges, but also with aerobic biological sludges (for example, see Patent Documents 1 to 4). A granulated biological sludge has, for example, an average particle size of 0.2 mm or greater, and a settling rate of 5 m/h or greater. In a semibatch biological treatment, the four steps of (1) wastewater introduction, (2) biological treatment of the treatment target substances, (3) settling of the biological sludge, and (4) discharge of the treated water are generally performed repeatedly in a single reaction tank.

Further, in Patent Document 5, a semibatch biological treatment method is disclosed in which the three steps of (1) introduction of wastewater and discharge of treated water, (2) biological treatment of the treatment target substances, and (3) settling of the biological sludge are performed repeatedly.

CITATION LIST

Patent Literature

Patent Document 1: WO 2004/024638
Patent Document 2: JP 2008-212878 A
Patent Document 3: JP 4975541 B
Patent Document 4: JP 4804888 B
Patent Document 5: JP 2016-77931 A

SUMMARY

Technical Problem

However, in the wastewater introduction step in a semibatch biological treatment, the wastewater is generally supplied from a lower portion of the tank using a pump, but in this method, increased running costs are a concern, and therefore a simple wastewater introduction method would be desirable.

Accordingly, an object of the present invention is to provide a water treatment method and a water treatment device that enable a wastewater to be introduced into the reaction tank by a simple configuration that does not use a pump.

Solution to Problem (1) An embodiment of the present invention provides a water treatment method that uses a reaction tank in which an operational cycle is performed repeatedly, the operational cycle having an inflow step of introducing a wastewater, a biological treatment step of biologically treating the wastewater with a biological sludge, a settling step of allowing the biological sludge to settle, and a discharge step of discharging the biologically treated water that has undergone the biological treatment, wherein the reaction tank is provided with an inflow port disposed at a position lower than the interface position of the biological sludge bed formed in the bottom portion of the reaction tank during the settling step, and an inflow section that extends upward in a vertical direction from the inflow port, and in the inflow step, the wastewater flows down the inside of the inflow section due to gravity and is supplied into the biological sludge bed from the inflow port.

(2) In the water treatment method according to (1) above, in the operational cycle, the discharge step is preferably conducted while conducting the inflow step.

(3) The water treatment method according to (1) or (2) above preferably also includes at least one of a sludge supply step of supplying the biological sludge inside the reaction tank, and a treated water supply step of supplying the biologically treated water inside the reaction tank, to a continuous biological treatment tank which conducts a biological treatment with a biological sludge while receiving continuous inflow of a wastewater.

(4) In the water treatment method according to any one of (1) to (3) above, in the inflow step, it is preferable that the wastewater flows down the inside of the inflow section due to gravity, and is supplied into the biological sludge bed from the inflow port in either a horizontal direction or a direction below horizontal.

(5) In the water treatment method according to (1) above, in the operational cycle, it is preferable that the discharge step is conducted while conducting the inflow step, the reaction tank is provided with a discharge port disposed at the water surface level inside the reaction tank, and the inflow port supplies at least a portion of the wastewater into the biological sludge bed in a horizontal direction.

(6) In the water treatment method according to (5) above, it is preferable that the inside of the reaction tank is divided by a partition wall into a first chamber into which the wastewater is introduced and a second chamber in which the operational cycle is conducted, the discharge port is provided in the second chamber side and is disposed at the water surface level inside the second chamber, and the inflow port is provided in the partition wall, so as to connect the first chamber and the second chamber, is disposed at a position lower than the interface level of the biological sludge bed formed in the bottom portion of the second chamber in the settling step, and supplies the wastewater in a horizontal direction into the biological sludge bed formed in the bottom portion of the second chamber.

(7) In the water treatment method according to (5) or (6) above, it is preferable that the reaction tank is a rectangular water tank, and the inflow port and the discharge port are provided at the same surface of the rectangular water tank.

(8) In the water treatment method according to any one of (5) to (7) above, the flow velocity v (cm/sec) of wastewater through the inflow port and the distance N (m) in the horizontal direction from the inflow port to the side surface of the reaction tank opposing the inflow port preferably satisfies the following equation.

$$20 \leq v/N^{1/2} \leq 80$$

(9) An embodiment of the present invention provides a water treatment device that includes a reaction tank in which an operational cycle is performed repeatedly, the operational cycle having an inflow step of introducing a wastewater, a biological treatment step of biologically treating the wastewater with a biological sludge, a settling step of allowing the biological sludge to settle, and a discharge step of discharging the biologically treated water that has undergone the biological treatment, wherein the reaction tank is provided with an inflow port disposed at a position lower than the interface position of the biological sludge bed formed in the bottom portion of the reaction tank during the settling step, and an inflow section that extends upward in a vertical direction from the inflow port, and in the inflow step, the wastewater flows down the inside of the inflow section due to gravity and is supplied into the biological sludge bed from the inflow port.

(10) In the water treatment device according to (9) above, in the operational cycle, the discharge step is preferably conducted while conducting the inflow step.

(11) The water treatment device according to (9) or (10) above preferably also includes at least one of a sludge supply section for supplying the biological sludge inside the reaction tank, and a treated water supply section for supplying the biologically treated water inside the reaction tank, to a continuous biological treatment tank which conducts a biological treatment with a biological sludge while receiving continuous inflow of a wastewater.

(12) In the water treatment device according to any one of (9) to (11) above, the inflow port preferably opens in either a horizontal direction or a direction below horizontal.

(13) In the water treatment device according to (9) above, in the operational cycle, it is preferable that the discharge step is conducted while conducting the inflow step, the reaction tank is provided with a discharge port installed at the water surface level inside the reaction tank, and the inflow port supplies at least a portion of the wastewater into the biological sludge bed in a horizontal direction.

(14) In the water treatment device according to (13) above, it is preferable that the reaction tank includes a partition wall which divides the inside of the tank into a first chamber into which the wastewater is introduced and a second chamber in which the operational cycle is conducted, the discharge port is provided in the second chamber side and is disposed at the water surface level inside the second chamber, and the inflow port is provided in the partition wall, so as to connect the first chamber and the second chamber, is disposed at a position lower than the interface level of the biological sludge bed formed in the bottom portion of the second chamber in the settling step, and supplies the wastewater in a horizontal direction into the biological sludge bed formed in the bottom portion of the second chamber.

(15) In the water treatment device according to (13) or (14) above, it is preferable that the reaction tank is a rectangular water tank, and the inflow port and the discharge port are provided at the same surface of the rectangular water tank.

(16) In the water treatment device according to any one of (13) to (15) above, the flow velocity v (cm/sec) of wastewater through the inflow port and the distance N (m) in the horizontal direction from the inflow port to the side surface of the reaction tank opposing the inflow port preferably satisfies the following equation.

$$20 \leq v/N^{1/2} \leq 80$$

Advantageous Effects of Invention

By using the present invention, a water treatment method and a water treatment device can be provided that enable a wastewater to be introduced into the reaction tank by a simple configuration that does not use a pump.

DESCRIPTION OF EMBODIMENTS

Embodiments of the present invention are described below. These embodiments are merely examples of implementing the present invention, and the present invention is not limited to these embodiments.

Figure 1:
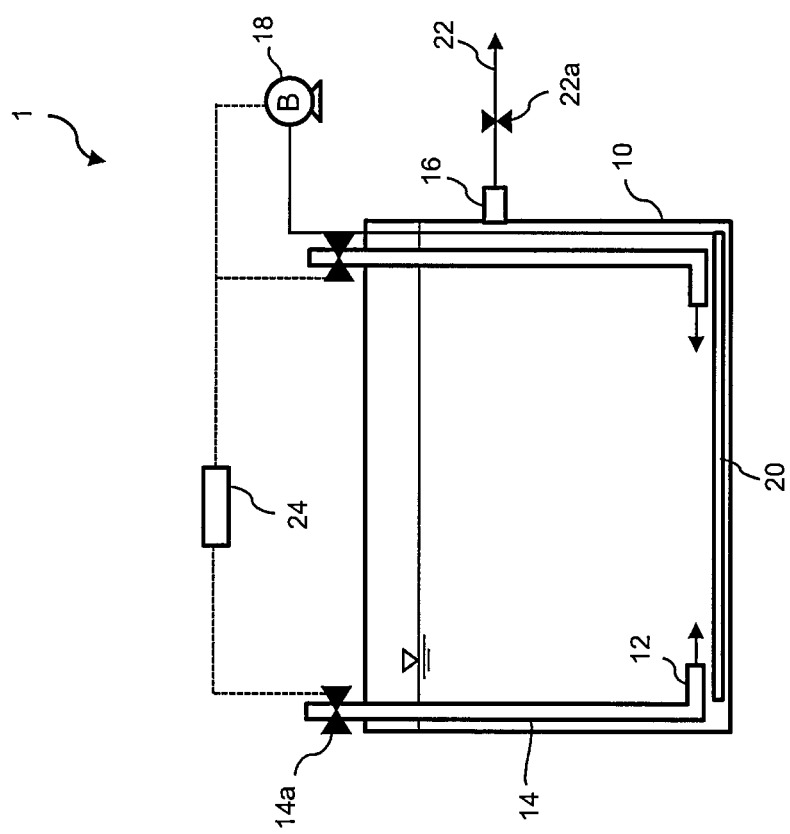
FIG. 1 is a schematic cross-sectional view illustrating one example of a water treatment device according to an embodiment of the present invention.

FIG. 1 is a schematic cross-sectional view illustrating one example of a water treatment device according to an embodiment of the present invention. As illustrated in FIG. 1, the water treatment device 1 includes a reaction tank 10, an aeration device containing a blower 18 and an aeration line 20, a treated water discharge line 22 and a control device 24.

In the reaction tank 10 are provided an inflow port 12 and an inflow line 14 for introducing a wastewater into the tank. The inflow line 14 is an inflow section that extends upward in the vertical direction from the inflow port 12. In this description, the expression that the inflow section extends in the vertical direction includes cases where the inflow section extends in a substantially vertical direction. The expression "substantially vertical direction" includes all directions having an angle of inclination within 45° C. of the vertical direction. An electromagnetic valve 14a is installed in the inflow line 14, and the electromagnetic valve 14a is connected electrically to the control device 24.

In the settling step described below, the inflow port 12 is disposed at a position lower than the interface position of the biological sludge bed formed in the bottom portion of the reaction tank 10. The inflow port 12 illustrated in FIG. 1 is provided at the bottom end of the inflow line 14 and opens toward the horizontal direction.

FIGS. 2(A) to (C) are schematic top views of the reaction tank for describing examples of the positioning of inflow pipes. There are no particular limitations on the number of inflow lines 14 provided with an inflow port 12, but in terms of enhancing the diffusion of the wastewater, a plurality of inflow lines 14 is preferred. Using a rectangular reaction tank as an example, the inflow lines 14 provided with an inflow port 12 are preferably disposed, for example, in at least one of the following configurations: in at least two locations at opposing corners of the reaction tank 10 as illustrated in FIG. 2(A), in at least two locations on opposing sides of the reaction tank 10 as illustrated in FIG. 2(B), or in at least two locations on the same side of the reaction tank as illustrated in FIG. 2(C).

Further, a discharge port 16 for discharging the treated water that has been biologically treated inside the reaction tank 10 is also provided in the reaction tank 10. A treated water discharge line 22 is connected to the discharge port 16. An electromagnetic valve 22a is installed in the treated water discharge line 22, and the electromagnetic valve 22a is connected electrically to the control device 24.

The blower 18 that constitutes the aeration device is connected to the aeration line 20, and an aeration gas such as oxygen or air is fed into the aeration line 20 by the blower 18, with the aeration gas then supplied to the reaction tank 10 through the aeration line 20. As a result, the water inside the reaction tank 10 flows and is stirred. Although omitted from the drawing, a stirring device in which, for example, a stirring blade is rotated by the rotation of a motor may be installed in the reaction tank 10 to stir the water inside the reaction tank 10. The water treatment device 1 illustrated in FIG. 1 assumes biological treatment under aerobic conditions, but the device may also be applied to biological treatment under anaerobic conditions. In those cases where treatment is conducted under anaerobic conditions, a stirring device may be installed, but the aeration device need not be installed.

The control device 24 is composed, for example, of a microcomputer having a CPU that runs a program and ROM and RAM that store the program and calculations results, and an electrical circuit and the like, and has the functions of controlling the aeration device and opening and closing the electromagnetic valves.

An example of the operation of the water treatment device 1 of the present embodiment is described below.

Figure 3:
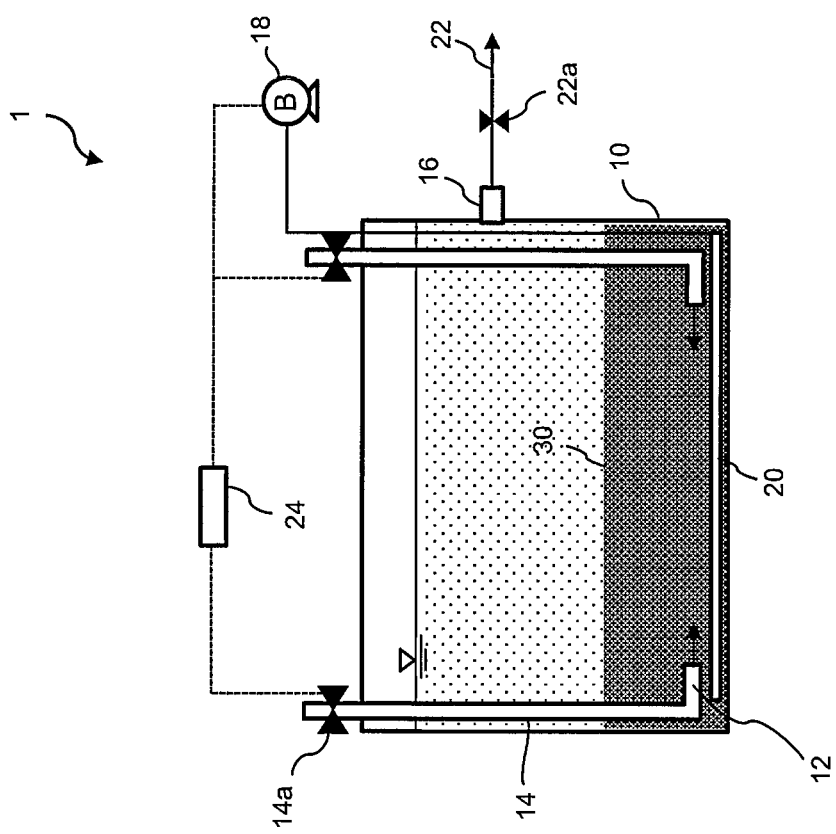
FIG. 3 is a schematic cross-sectional view illustrating one example of the state of the water treatment device during the inflow step.

FIG. 3 is a schematic cross-sectional view illustrating one example of the state of the water treatment device during the inflow step. The electromagnetic valve 14a is opened by the control device 24, and the wastewater flows down the inside of the inflow line 14 due to gravity, and is supplied into the reaction tank 10 from the inflow port 12. The inflow port 12 is disposed at a position lower than the interface level of a biological sludge bed 30 formed in the settling step described below, and opens along the horizontal direction, and therefore, as illustrated in FIG. 3, the wastewater is supplied in the horizontal direction from the inflow port 12 through the interior of the biological sludge bed 30.

Figure 4:
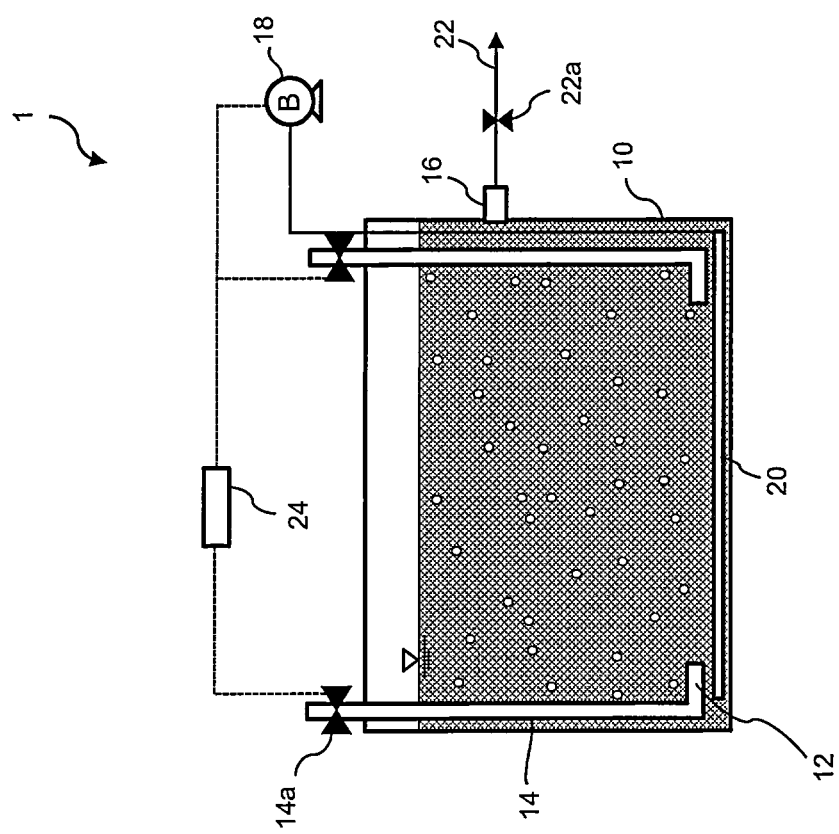
FIG. 4 is a schematic cross-sectional view illustrating one example of the state of the water treatment device during the biological treatment step.

FIG. 4 is a schematic cross-sectional view illustrating one example of the state of the water treatment device during the biological treatment step. Once the water level of the wastewater inside the reaction tank 10 has reached the prescribed level via the inflow step, the control device 24 closes the electromagnetic valve 14a and starts operation of the blower 18. As a result, as illustrated in FIG. 4, the aeration gas is supplied from the aeration line 20 into the interior of the reaction tank 10, and the wastewater and biological sludge inside the reaction tank 10 are stirred. Accordingly, the wastewater inside the reaction tank 10 is biologically treated by the biological sludge (the biological treatment step), and treatment target substances in the wastewater (such as organic matter and the like) are decomposed.

Figure 5:
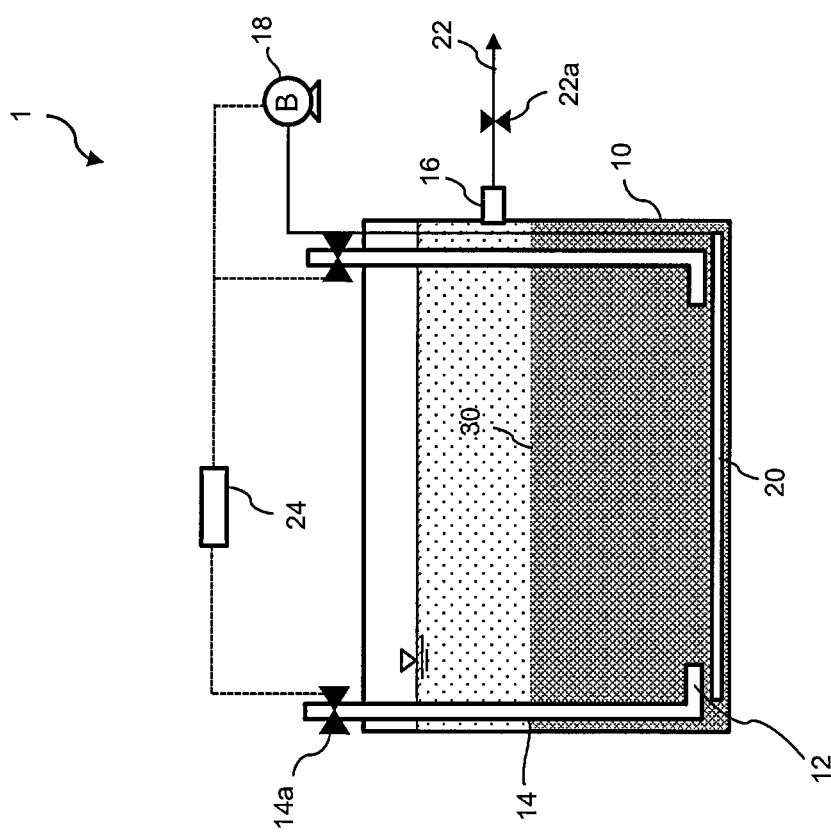
FIG. 5 is a schematic cross-sectional view illustrating one example of the state of the water treatment device during the settling step.

FIG. 5 is a schematic cross-sectional view illustrating one example of the state of the water treatment device during the settling step. After the biological treatment step has been conducted for a prescribed time, operation of the blower 18 is stopped by the control device 24, and the stirring and aeration of the wastewater inside the reaction tank 10 is stopped. As a result, as illustrated in FIG. 5, settling of the biological sludge occurs (the settling step), and the biological sludge bed 30 is formed on the bottom of the reaction tank 10.

Figure 6:
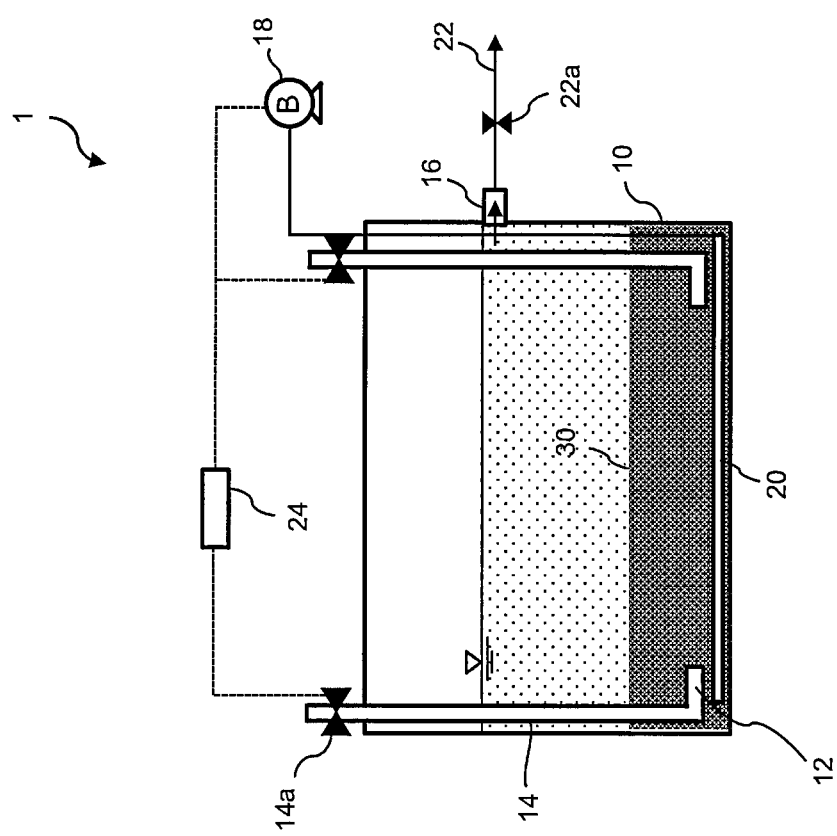
FIG. 6 is a schematic cross-sectional view illustrating one example of the state of the water treatment device during the discharge step.

FIG. 6 is a schematic cross-sectional view illustrating one example of the state of the water treatment device during the discharge step. After the settling step has been allowed to proceed for a prescribed time, forming the biological sludge bed 30 in the bottom portion of the reaction tank 10, the electromagnetic valve 22a is opened by the control device 24 and, as illustrated in FIG. 6, the biologically treated water that has undergone biological treatment in the reaction tank 10 is discharged from the discharge port 16 into the treated water discharge line 22 (the discharge step). The treated water is discharged from the treated water discharge line 22 to a position outside the system of the water treatment device 1. Once the discharge step has been conducted for a prescribed time, the procedure returns to the inflow step described above.

In this manner, in the water treatment device 1 illustrated in FIG. 1, an operational cycle is conducted in which the four steps composed of the inflow step, the biological treatment step, the settling step and the discharge step are repeated, but in the inflow step, the wastewater is introduced into the reaction tank 10 under the effect of gravity. In other words, in the water treatment device 1 illustrated in FIG. 1, the wastewater can be introduced using a simple configuration that does not use a pump, and therefore increases in, for example, equipment costs and running costs such as operational control costs can be suppressed. In particular, it is thought that applying the water treatment device 1 of the present embodiment to the water treatment device of a large-scale treatment facility will enable equipment costs and operational control costs to be effectively reduced.

It is thought that extracellular polymeric substances (EPS) produced by the bacteria affect the formation of a biological sludge with superior settling properties (for example, a granulated biological sludge) in the above operational cycle. In order to form EPS, formation of a concentration gradient of the treatment target substances that undergo biological treatment in the reaction tank 10 is important. For example, in those cases where organic matter in the wastewater is subjected to biological treatment, formation of a concentration gradient of the organic matter is important, whereas in those cases where nitrogen-containing substances such as ammoniacal nitrogen and nitrate nitrogen are subjected to biological treatment, formation of a concentration gradient of the nitrogen-containing substances is important. The concentration gradient of the treatment target substances may be formed, for example, by increasing the concentration of the treatment target substances inside the reaction tank 10 in the inflow step (satiated state), and then consuming the treatment target substances inside the reaction tank 10, thereby reducing the concentration of the treatment target substances inside the reaction tank 10 in the biological treatment step (starved state). In the present embodiment, in the inflow step, because the wastewater is supplied from the inflow port 12 into the biological sludge bed 30, the wastewater can be brought into contact with the biological sludge in an anaerobic state. As a result, in the present embodiment, in the inflow step, unnecessary consumption of the treatment target substances in the wastewater can be suppressed, and the concentration of the treatment target substances retained in the reaction tank 10 can be effectively increased, meaning the concentration gradient of the treatment target substances inside the reaction tank 10 can be increased. As a result, a biological sludge having superior settling properties can be formed, thus enabling the biological treatment speed to be increased.

The operating conditions for the water treatment device of the present embodiment and modifications and the like of the water treatment device are described below.

Examples of wastewaters that may be treated using the water treatment device 1 of the present embodiment include wastewaters containing substances (treatment target substances) having biodegradability, such as food processing plant wastewater, chemical plant wastewater, semiconductor plant wastewater, machinery plant wastewater, sewage, human waste and river water. Examples of the substances having biodegradability include organic matter and nitrogen-containing substances such as ammoniacal nitrogen and nitrate nitrogen. For example, in the case where a wastewater containing organic matter is subjected to biological treatment, the organic matter in the wastewater is decomposed to carbon dioxide through contact with the biological sludge (microorganisms). Further, in the case where a wastewater containing nitrogen-containing substances is subjected to biological treatment, the nitrogen-containing substances in the wastewater are decomposed to form nitrogen gas through contact with the biological sludge (microorganisms).

In those cases where the wastewater that is treated using the water treatment device 1 of the present embodiment contains a large oil and fat content, the oil and fat may sometimes have an adverse effect on the biological treatment, and therefore it is preferable that, prior to supply to the reaction tank 10, the oil and fat content of the wastewater is reduced, for example, to not more than about 150 mg/L using a conventional technique such as flotation separation, flocculation pressure flotation or adsorption.

There are no particular limitations on the BOD concentration of the wastewater that is treated using the water treatment device 1 of the present embodiment. The BOD concentration in a wastewater in which it is generally considered difficult to form a biological sludge of superior settling properties is typically within a range from 50 to 200 mg/L, but by using the water treatment device 1 according to the present embodiment, even within this BOD concentration range, a biological sludge having superior settling properties can still be formed. For example, with the water treatment device 1 according to the present embodiment, a biological sludge that exhibits settling indicators including an SVI30 value of not more than 50 mL/g and an SVI5 value of not more than 70 mL/g can be formed.

The flow velocity through the inflow port 12 in the inflow step may be set appropriately in accordance with the structure and size and the like of the reaction tank 10, and although there are no particular limitations, the flow velocity is, for example, preferably at least 1 cm/sec but not more than 200 cm/sec, and is more preferably at least 10 cm/sec but not more than 100 cm/sec. If the flow velocity through the inflow port 12 is less than 1 cm/sec, then in some cases the wastewater and the biological sludge may not make efficient contact, meaning the concentration of the treatment target substances retained in the tank in the inflow step may sometimes decrease. Further, if the flow velocity through the inflow port 12 is greater than 200 cm/sec, then in some cases the contents inside the reaction tank may be stirred excessively and some of the settled sludge may float up again, making it difficult to achieve efficient contact between the wastewater and the sludge, and preventing granulation from proceeding, and in some cases the refloated biological sludge may flow out through the discharge port, making it difficult to maintain processing functionality.

There are no particular limitations on the installation position of the inflow port 12, provided the position is lower than the interface position of the biological sludge bed 30 formed in the bottom portion of the reaction tank 10 in the settling step, but if the assumptions are made that the height of the reaction tank 10 is usually designed with an effective water depth of 2 m to 8 m, and operations are typically conducted with the interface height of the biological sludge bed 30 at 10% to 50% of the height of the reaction tank 10, then the inflow port 12 is preferably installed at a position within a height of 4 m from the bottom of the reaction tank 10, more preferably installed at a position within a height of 2 m from the bottom of the reaction tank 10, and even more preferably installed at a position within a height of 1 m from the bottom of the reaction tank 10.

The wastewater inflow ratio is, for example, preferably within a range from at least 10% to not more than 200%. The wastewater inflow ratio is the ratio of the amount of wastewater introduced in a single operational cycle relative to the effective volume inside the reaction tank 10. By ensuring that the wastewater inflow ratio falls within the above range, the concentration of the treatment target substances retained in the reaction tank 10 in the inflow step can be further increased, and a biological sludge of superior settling properties can be formed more efficiently.

In terms of factors such as maintaining the integrity (the settling properties and the activity and the like) of the sludge, the sludge concentration inside the reaction tank 10 in the biological treatment step is, for example, preferably within a range from 1,500 to 30,000 mg/L. Further, in terms of maintaining the sludge integrity and the like, the sludge load is preferably within a range from 0.05 to 0.60 kg-BOD/kg-MLSS/day, and is more preferably within a range from 0.1 to 0.5 kg-BOD/kg-MLSS/day. The biological treatment step time is set so that, for example, the sludge load falls within the above range. In cases where the sludge load exceeds the above range or cases where the sludge concentration exceeds the above range, some biological sludge is preferably extracted from the reaction tank 10.

The pH inside the reaction tank 10 is preferably set to a value within the range suitable for most microorganisms, and for example, is preferably within a range from 6 to 9, and more preferably from 6.5 to 7.5. If the pH value falls outside this range, then a pH adjustment is preferably performed by adding an acid or alkali to achieve a pH within the above range. The dissolved oxygen (DO) in the reaction tank 10, under aerobic conditions, is preferably at least 0.5 mg/L, and particularly preferably 1 mg/L or greater.

There are no particular limitations on the time of the settling step, provided the time extends from the end of the biological treatment step until the biological sludge bed 30 is formed in the bottom portion of the reaction tank 10, but the time is preferably sufficient for the height of the sludge interface of the biological sludge bed 30 to reach a height that is within a range from 10% to 50% of the height of the reaction tank 10.

Figure 2:
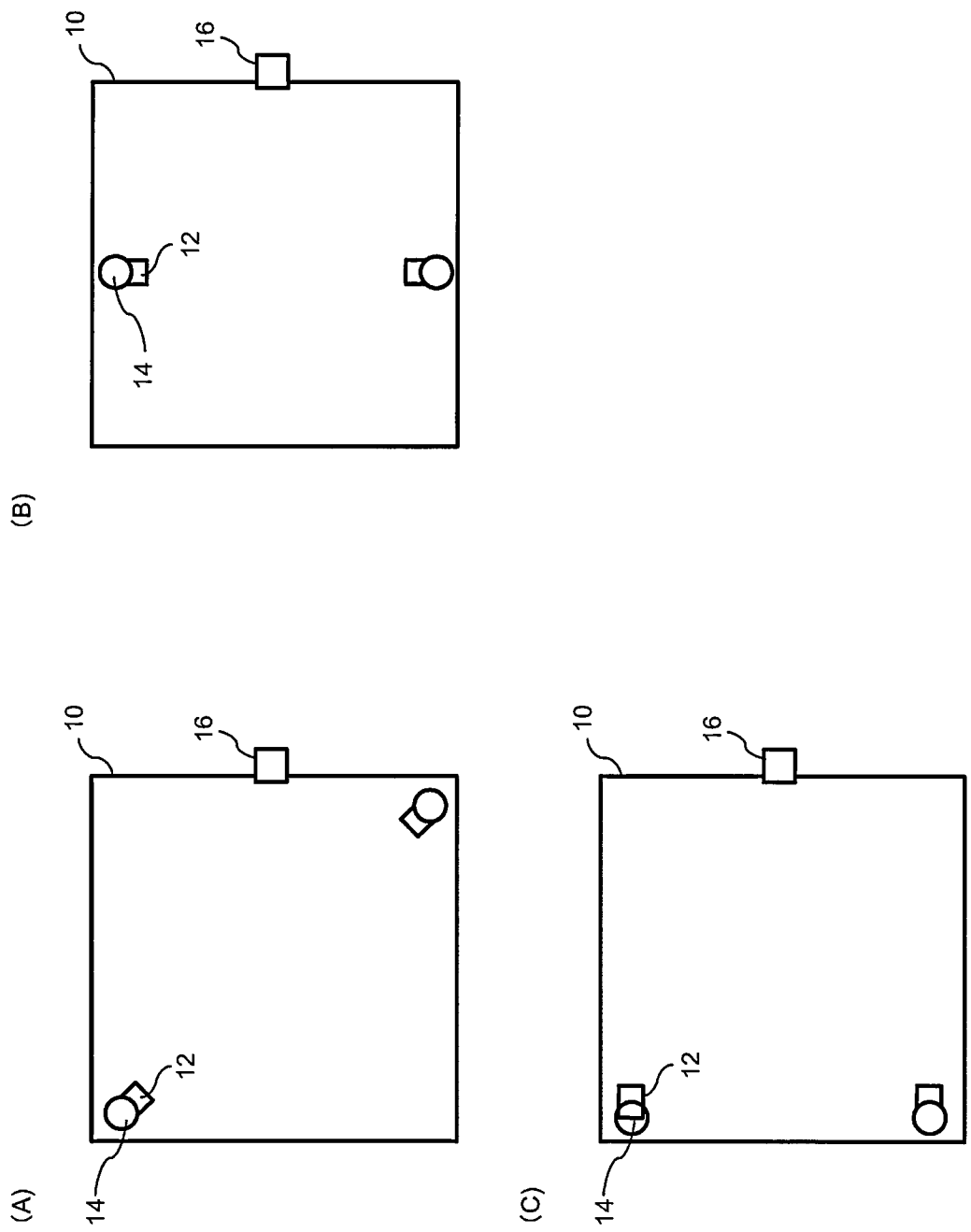
FIG. 2(A) to (C) are a series of schematic top views of a reaction tank for describing examples of the positioning of inflow pipes.

The shape of the reaction tank 10 is not limited to the type of rectangular shape illustrated in FIG. 2, and for example, may be a circular cylindrical shape or the like. Rectangular reaction tanks are employed, for example, in large-scale treatment plants such as sewage treatment plants or the like.

The operational cycle of the present embodiment may be any cycle that includes an inflow step, a biological treatment step, a settling step and a discharge step, and besides the operational cycle that involves repeating the four steps composed of the inflow step, the biological treatment step, the settling step and the discharge step described above, also includes an operational cycle that involves repeating three steps composed of a step of conducting the discharge step while conducting the inflow step (hereafter referred to as the inflow/discharge step), a biological treatment step and a settling step.

Figure 7:
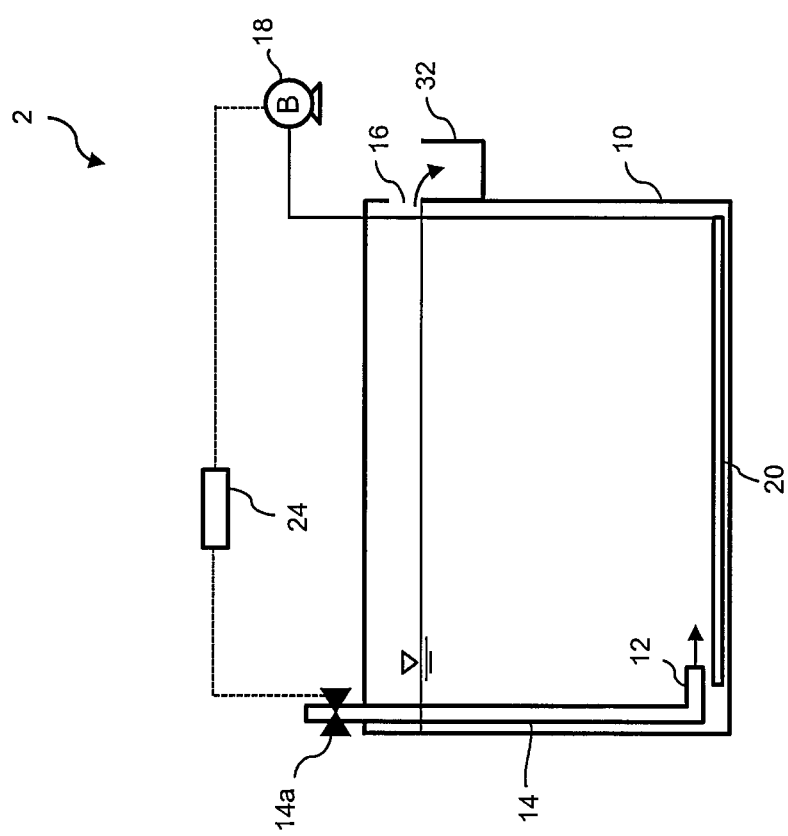
FIG. 7 is a schematic cross-sectional view illustrating another example of a water treatment device according to an embodiment of the present invention.

FIG. 7 is a schematic cross-sectional view illustrating another example of a water treatment device according to an embodiment of the present invention. In the water treatment device 2 in FIG. 7, those components that are the same as those of the wastewater treatment device 1 illustrated in FIG. 1 are labeled with the same reference signs, and description of those components is omitted. In the water treatment device 2 illustrated in FIG. 7, the discharge port 16 is provided in one side surface of the reaction tank. The discharge port 16 is disposed at the water surface level of the reaction tank 10 (specifically, the bottom edge of the discharge port 16 is positioned at the water surface level of the reaction tank 10). In this embodiment, as described below, because the discharge of the treated water is conducted together with the inflow of the wastewater, the water surface level of the reaction tank 10 undergoes no substantial fluctuation. Further, in the water treatment device 2 illustrated in FIG. 7, a treated water collection channel 32 is provided outside the reaction tank 10. The treated water collection channel 32 is connected to the interior of the reaction tank 10 via the discharge port 16 provided in the reaction tank 10.

One example of the operation of the water treatment device 2 of this embodiment is described below.

The electromagnetic valve 14a is opened by the control device 24, and the wastewater passes through the inflow line 14, and is flows into the reaction tank 10 from the inflow port 12. Once the water level of the wastewater inside the reaction tank 10 has reached a prescribed level, the electromagnetic valve 14a is closed and the blower 18 is activated by the control device 24. As a result, the aeration gas is supplied from the aeration line 20 into the reaction tank 10, and the wastewater and biological sludge inside the reaction tank 10 is stirred. Accordingly, the wastewater inside the reaction tank 10 is biologically treated by the biological sludge (the biological treatment step), and treatment target substances in the wastewater (such as organic matter and the like) are decomposed. After the biological treatment step has been conducted for a prescribed time, operation of the blower 18 is stopped by the control device 24, and the stirring and aeration of the wastewater inside the reaction tank 10 is stopped. As a result, settling of the biological sludge occurs (the settling step), and a biological sludge bed is formed on the bottom of the reaction tank 10. After the settling step has been allowed to proceed for a prescribed time, forming the biological sludge bed 30 in the bottom portion of the reaction tank 10, the electromagnetic valve 14a is opened by the control device 24, and wastewater flows down the inside of the inflow line 14 due to gravity, and is supplied into the biological sludge bed from the inflow port 12, while the biologically treated water that has undergone biological treatment in the reaction tank 10 is discharged from the discharge port 16 into the treated water collection channel 32 (the inflow/discharge step). The treated water is discharged from the treated water collection channel 32 to a position outside the system of the water treatment device 2. Once the inflow/discharge step has been conducted for a prescribed time, the procedure returns to the biological treatment step described above.

The inflow/discharge step time is determined, for example, in accordance with the wastewater inflow ratio and the flow rate of the wastewater into the reaction tank 10. However, if the water area load of the reaction tank 10, calculated by dividing the flow rate of the wastewater into the reaction tank 10 by the horizontal cross-sectional area of the reaction tank 10, is set to a high value, then the light sludge fraction within the sludge can be selectively discharged from the system while the sludge fraction having superior settling properties can be retained inside the tank, meaning the formation of a biological sludge of superior settling properties is promoted, but there is a possibility that, in the startup period and the like when the settling properties of the sludge are not favorable, the sludge may flow out of the tank, resulting in a deterioration in the biological treatment functionality. On the other hand, if the water area load of the reaction tank 10 is set to a low value, then the sludge selection effect weakens, and moreover in those cases where the wastewater inflow ratio is increased, the inflow/discharge step time may lengthen, and there is a possibility that formation of a sludge having superior settling properties may become difficult. In light of these circumstances, the water area load on the reaction tank 10 is preferably at least 0.5 m/h but not more than 20 m/h, and is more preferably within a range from at least 1 m/h to not more than 10 m/h. Further, in those cases where the water area load of the reaction tank 10 can be set to a higher value due to an improvement in the settling properties of the biological sludge inside the tank, the water area load of the reaction tank 10 may be increased in accordance with the settling properties of the biological sludge, and the inflow/discharge step time may also be shortened in accordance with the water area load and the wastewater inflow ratio.

Figure 8:
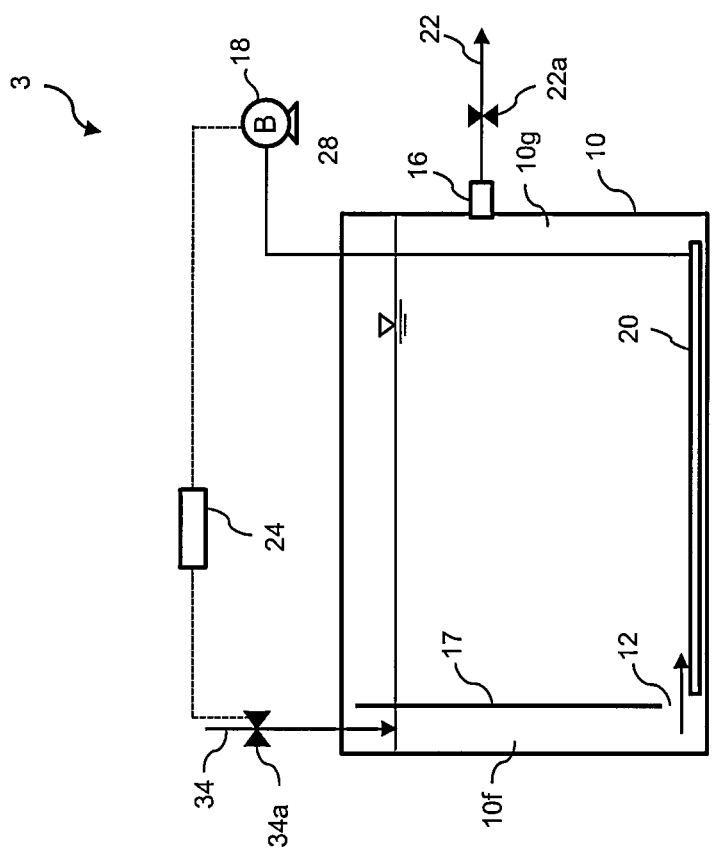
FIG. 8 is a schematic cross-sectional view illustrating another example of a water treatment device according to an embodiment of the present invention.

FIG. 8 is a schematic cross-sectional view illustrating another example of a water treatment device according to an embodiment of the present invention. In the water treatment device 3 illustrated in FIG. 8, those components that are the same as those of the wastewater treatment device 1 illustrated in FIG. 1 are labeled with the same reference signs, and description of those components is omitted. The water treatment device 3 illustrated in FIG. 8 has a partition wall 17. The partition wall 17 is installed along the vertical direction inside the reaction tank 10, and divides the inside of the reaction tank 10 into a first chamber 10f and a second chamber 10g. An opening that connects the first chamber 10f and the second chamber 10g is provided at the bottom of the partition wall 17, and this opening functions as the component that has until this point been described as the inflow port 12. The first chamber 10f divided by the partition wall 17 functions as an inflow section that extends upward in the vertical direction from the inflow port 12, and the second chamber 10g divided by the partition wall 17 functions as the chamber in which the aforementioned operational cycle (the inflow step, biological treatment step, settling step and discharge step) is conducted.

In the inflow step in the water treatment device 3 illustrated in FIG. 8, an electromagnetic valve 34a is opened by the control device 24, and the wastewater is supplied into the first chamber 10f from a raw water introduction line 34. The wastewater flows down the inside of the first chamber 10f due to gravity, and is supplied from the inflow port 12 into a biological sludge bed formed in the bottom portion of the second chamber 10g. Following this inflow step, the biological treatment step, the settling step and the discharge step are conducted inside the second chamber 10g. As illustrated in FIG. 7, the discharge port 16 may also be disposed at the water surface level of the reaction tank 10a, so that the inflow/discharge step, the biological treatment step and the settling step may be conducted.

There are no particular limitations on the shape of the opening (the inflow port 12) provided in the partition wall 17, and the opening may be rectangular, circular or oval-shaped or the like. Further, at least one opening (the inflow port 12) is formed in the partition wall 17.

Although there are no particular limitations on the installation position of the partition wall 17, in terms of factors such as ensuring that the wastewater can effectively contact the biological sludge bed inside the second chamber 10g, the partition wall 17 is preferably installed so that the ratio of the width of the first chamber 10f when viewed in a vertical cross-section of the reaction tank 10 relative to the width of the second chamber 10g is not more than 1/2, and the partition wall 17 is more preferably installed so that this ratio is 1/5 or less.

Figure 9:
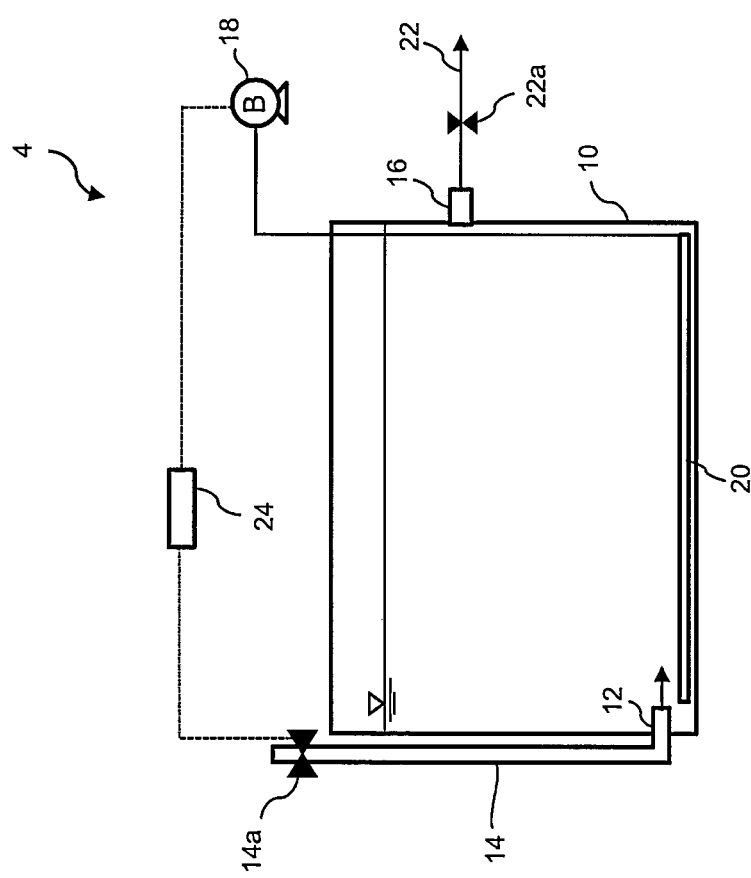
FIG. 9 is a schematic cross-sectional view illustrating another example of a water treatment device according to an embodiment of the present invention.

FIG. 9 is a schematic cross-sectional view illustrating another example of a water treatment device according to an embodiment of the present invention. In the water treatment device 4 illustrated in FIG. 9, those components that are the same as those of the wastewater treatment device 1 illustrated in FIG. 1 are labeled with the same reference signs, and description of those components is omitted. In the water treatment device 4 illustrated in FIG. 9, the inflow port 12 is provided in a side surface of the reaction tank 10, and the inflow line 14 that extends upward in the vertical direction from the inflow port 12 is disposed outside the reaction tank 10. In this manner, the inflow line 14 may be installed outside the reaction tank 10.

Figure 10:
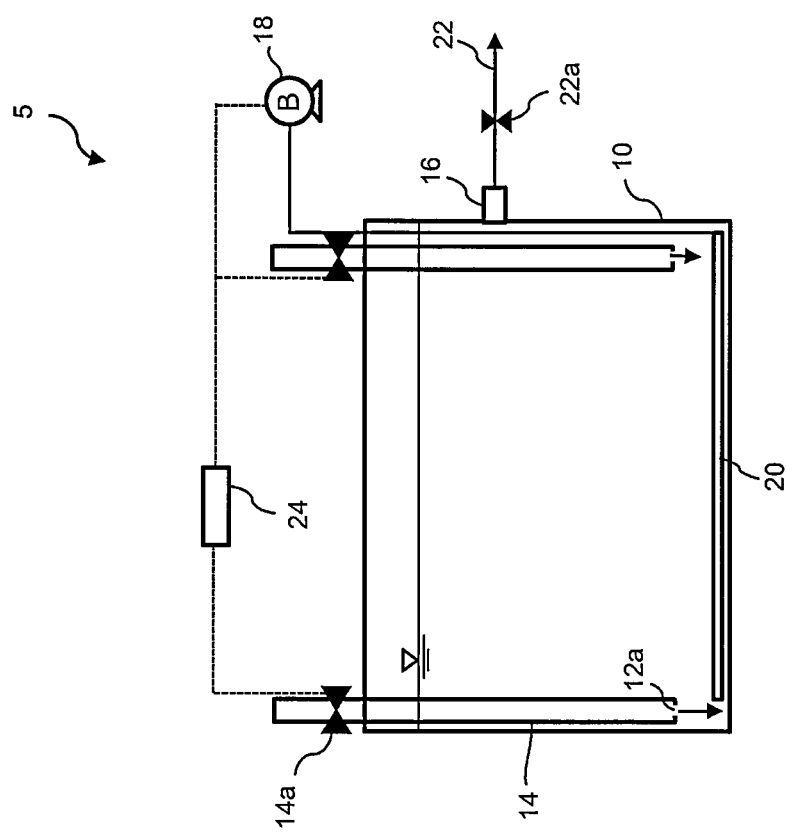
FIG. 10 is a schematic cross-sectional view illustrating another example of a water treatment device according to an embodiment of the present invention.
Figure 11:
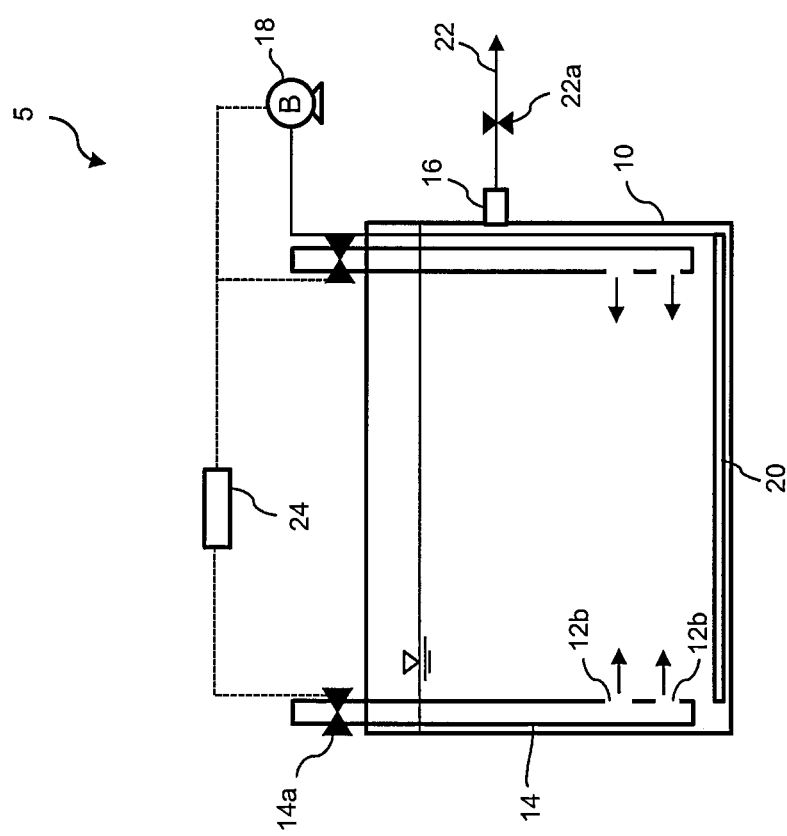
FIG. 11 is a schematic cross-sectional view illustrating another example of a water treatment device according to an embodiment of the present invention.
Figure 12:
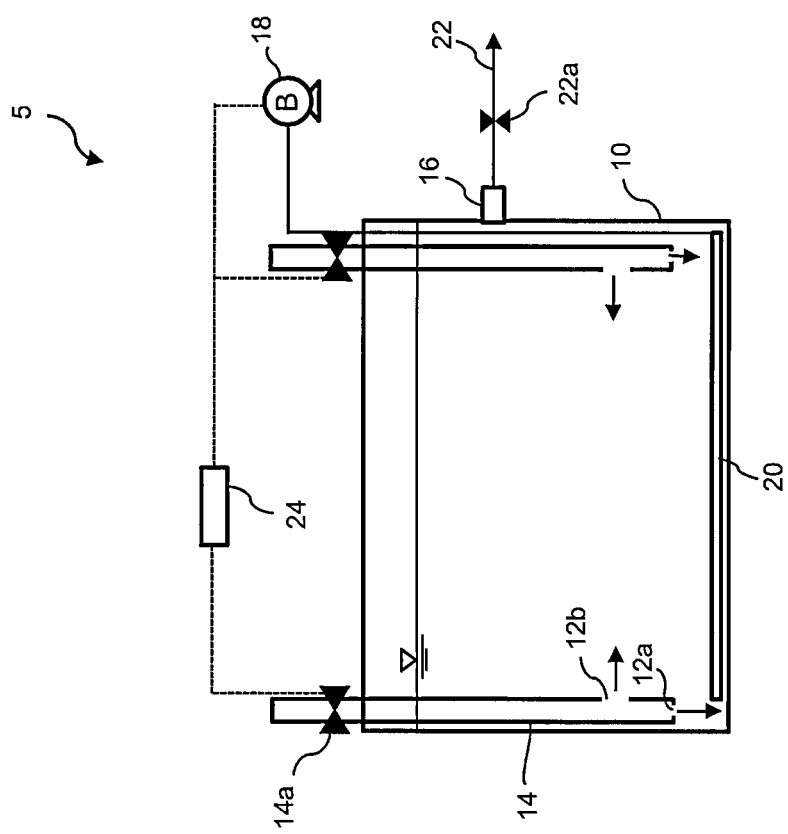
FIG. 12 is a schematic cross-sectional view illustrating another example of a water treatment device according to an embodiment of the present invention.

FIGS. 10 to 12 are schematic cross-sectional view illustrating other examples of a water treatment device according to an embodiment of the present invention. In the water treatment devices 5 of FIGS. 10 to 12, those components that are the same as those of the wastewater treatment device 1 illustrated in FIG. 1 are labeled with the same reference signs, and description of those components is omitted. In the water treatment device 5 illustrated in FIG. 10, an inflow port 12a is formed at the bottom end of the inflow line 14. The inflow port 12a illustrated in FIG. 10 opens downward in the vertical direction, and the wastewater is supplied downward in the vertical direction from the inflow port 12a into the biological sludge bed. Further, in the water treatment device illustrated in FIG. 11, inflow ports 12b are formed in two locations in the side surface of the inflow line 14. The inflow ports 12b illustrated in FIG. 11 each open along the horizontal direction, and therefore the wastewater is supplied in the horizontal direction from each of the inflow ports 12b into the biological sludge bed. Furthermore, in the water treatment device 5 illustrated in FIG. 12, inflow ports 12a and 12b are formed in two locations in the bottom end and the side surface respectively of the inflow line 14. The bottom end inflow port 12a illustrated in FIG. 12 opens downward in the vertical direction, whereas the side surface inflow port 12b opens open along the horizontal direction, and therefore the wastewater is supplied downward in the vertical direction from the bottom end inflow port 12a into the biological sludge bed, and is also supplied in the horizontal direction from the side surface inflow port 12b into the biological sludge bed.

Figure 13:
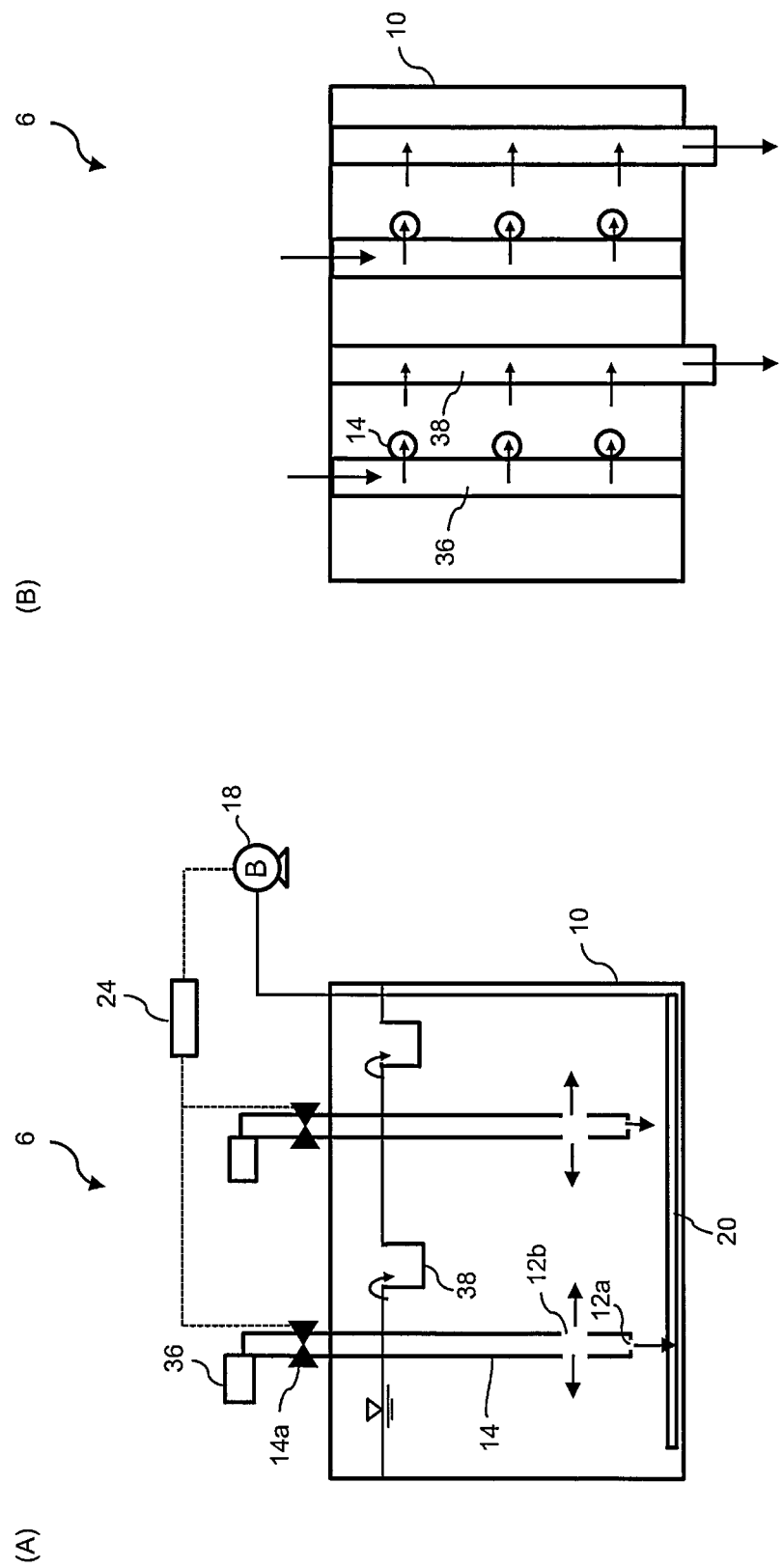
FIG. 13(A) is a schematic cross-sectional view illustrating another example of a water treatment device according to an embodiment of the present invention, and (B) is a schematic top view illustrating another example of a water treatment device according to an embodiment of the present invention.

At least one inflow port is provided per inflow pipe, but in terms of the diffusibility and the like of the wastewater, two or more inflow ports are preferably provided, as illustrated in FIG. 11 and FIG. 12. Further, although there are no particular limitations on the opening direction of the inflow port, if consideration is given to the diffusibility of the wastewater, then an opening in either the horizontal direction or a direction below horizontal, as illustrated in FIGS. 11 to 13, is preferred. In other words, the wastewater is preferably supplied from the inflow port into the biological sludge bed in either the horizontal direction or a direction below horizontal.

FIG. 13(A) is a schematic cross-sectional view illustrating another example of a water treatment device according to an embodiment of the present invention. FIG. 13(B) is a schematic top view illustrating another example of a water treatment device according to an embodiment of the present invention. In the water treatment device 6 illustrated in FIG. 13, those components that are the same as those of the wastewater treatment device 1 illustrated in FIG. 1 are labeled with the same reference signs, and description of those components is omitted. In FIG. 13(B), the aeration device including the blower 18 and the aeration line 20, and the control device 24 are omitted. The water treatment device 6 illustrated in FIG. 13 includes a wastewater inflow trough 36, which is provided above the reaction tank 10 and extends in a substantially horizontal direction, and a treated water collection trough 38, which is provided at the water surface level inside the reaction tank 10 and extends in a substantially horizontal direction. A plurality of inflow lines 14 are connected to the wastewater inflow trough 36. The inflow ports 12a and 12b are formed in the bottom end and the side surface of each inflow line 14.

The water treatment device 6 illustrated in FIG. 13 conducts an operational cycle that repeats the inflow/discharge step, the biological treatment step and the settling step. Specifically, in the inflow/discharge step, the wastewater flows into each of the inflow lines 14 from each wastewater inflow trough 36, and then flows down the inside of the inflow lines 14 due to gravity and is supplied into the biological sludge bed from the inflow ports (12a and 12b), while the biologically treated water inside the reaction tank 10 overflows into each treated water collection trough 38, and is discharged from the treated water collection trough 38 to a position outside the reaction tank 10. Following the inflow/discharge step, the biological treatment step and the settling step described above are conducted.

The biological sludge of superior settling properties formed in the water treatment device of an embodiment of the present invention may be used in its own biological treatment, or may be removed from the reaction tank 10 and supplied to another biological treatment tank. This other biological treatment tank may be a semibatch system similar to the embodiments of the present invention, or may be a continuous system in which the biological treatment is conducted while the wastewater is introduced in a continuous manner. Further, the biologically treated water obtained from the water treatment device of an embodiment of the present invention may be supplied to another biological treatment tank (having either a continuous system or a semibatch system). A more specific description is provided below using the drawings.

Figure 14:
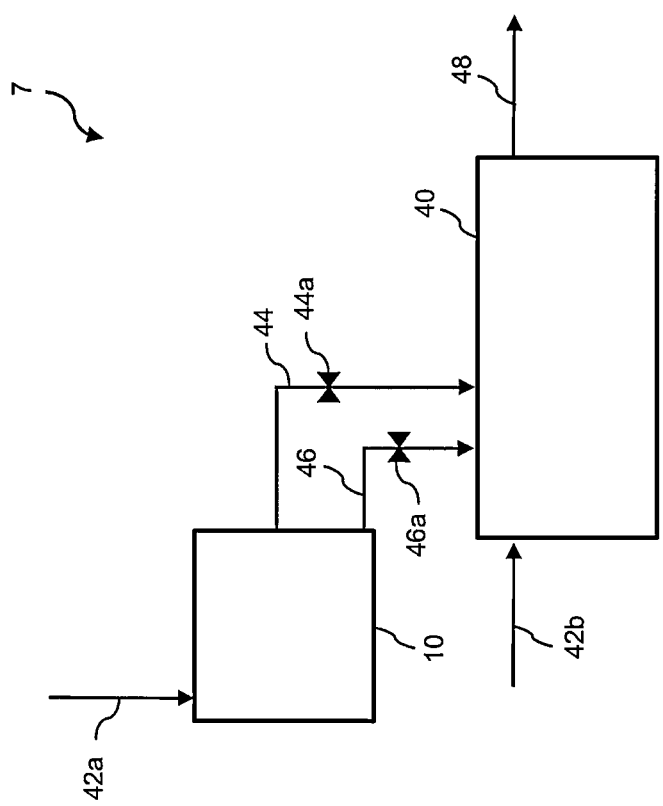
FIG. 14 is a schematic structural diagram illustrating another example of a water treatment device according to an embodiment of the present invention.

FIG. 14 is a schematic structural diagram illustrating another example of a water treatment device according to an embodiment of the present invention. The water treatment device 7 illustrated in FIG. 14 includes a reaction tank 10 and a continuous biological treatment tank 40. The reaction tank 10 is a reaction tank of an embodiment of the present invention, and because the specific construction is as described above, further description is omitted here. The water treatment device 7 illustrated in FIG. 14 includes raw water introduction lines 42a and 42b, a treated water supply line 44, a biological sludge supply line 46, and a treated water discharge line 48. A valve 44a is provided in the treated water supply line 44, and a valve 46a is provided in the biological sludge supply line 46.

The raw water introduction line 42a is connected to the reaction tank 10 (specifically to the inflow section). The raw water introduction line 42b is connected to the continuous biological treatment tank 40. One end of the treated water supply line 44 is connected to the reaction tank 10, and the other end is connected to the continuous biological treatment tank 40. Further, one end of the biological sludge supply line 46 is connected to the reaction tank 10, and the other end is connected to the continuous biological treatment tank 40. The treated water discharge line 48 is connected to the continuous biological treatment tank 40.

The wastewater flowing through the raw water introduction line 42a is supplied to the reaction tank 10, and the wastewater flowing through the raw water introduction line 42b is supplied to the continuous biological treatment tank 40. In the reaction tank 10, the operational cycle described above (the inflow step (inflow/discharge step), the biological treatment step, the settling step and the discharge step) is conducted. Then, by opening the valve 46a at an arbitrary time, the biological sludge of superior settling properties that has formed in the reaction tank 10 is supplied from the biological sludge supply line 46 into the continuous biological treatment tank 40. Further, by opening the valve 44a at an arbitrary time, the treated water inside the reaction tank 10 is supplied from the treated water supply line 44 into the continuous biological treatment tank 40. In the continuous biological treatment tank 40, for example, under aerobic conditions, and in the presence of the biological sludge supplied from the reaction tank 10, the wastewater introduced continuously from the raw water introduction line 42b and the wastewater introduced as appropriate from the reaction tank 10 via the treated water supply line 44 are subjected to biological treatment. In this manner, by supplying the biological sludge of superior settling properties formed in the reaction tank 10 to the continuous biological treatment tank 40, for example, the biological treatment speed of the continuous biological treatment tank 40 may be increased.

FIG. 15(A) is a schematic cross-sectional view illustrating one example of a water treatment device according to an embodiment of the present invention, and FIG. 15(B) is a schematic top view illustrating one example of a water treatment device according to an embodiment of the present invention. As illustrated in FIG. 15(A), the water treatment device 101 includes a reaction tank 110, a raw water introduction device having a raw water introduction line 112, a raw water pump 114 and an electromagnetic valve 116, an aeration device having a blower 118 and an aeration line 120, a treated water collection channel 122, and a control device 124. In FIG. 15(B), the aeration device having the blower 118 and the aeration line 120, and the control device 124 are omitted.

The reaction tank 110 of this embodiment has an inflow port 126 for introducing the wastewater into the tank. In the reaction tank 110 illustrated in FIG. 15, a plurality of inflow ports 126 are installed in one side surface of the reaction tank 110. The inflow ports 126 are disposed at positions lower than the interface position of the biological sludge bed formed in the bottom portion of the reaction tank 110 during the settling step described below, and open along the horizontal direction, meaning the wastewater is supplied from the inflow ports 126 into the biological sludge bed in the horizontal direction. The horizontal direction prescribed in this description includes substantially horizontal directions. The expression "substantially horizontal direction" includes all directions having an angle of inclination within 10° C. of the horizontal direction (typically a direction parallel with the direction across which the flat surface of the bottom of the reaction tank extends).

There are no particular limitations on the number of the inflow ports 126, but in terms of enhancing the diffusibility of the wastewater, a plurality of ports is desirable. In those cases where a plurality of the inflow ports 126 are installed, in terms of improving the diffusibility of the wastewater, the inflow ports are preferably installed, for example, at intervals of 0.5 m to 5 m. Provided that the inflow ports 126 open in such a manner that supplies the wastewater into the biological sludge bed in a horizontal direction, the ports may be disposed at positions higher than the interface level of the biological sludge bed formed in the bottom portion of the reaction tank 110 in the settling step.

Furthermore, the reaction tank 110 of the present embodiment also includes a discharge port 128 that discharges the treated water that has undergone biological treatment inside the reaction tank 110. In the reaction tank 110 illustrated in FIG. 15, the discharge port 128 is provided in the side surface of the reaction tank 110 opposite the side surface in which the inflow ports 126 are provided. The discharge port 128 is disposed at the water surface level of the reaction tank 110 (specifically, the bottom edge of the discharge port 128 is positioned at the water surface level of the reaction tank 110). In this embodiment, as described below, because the discharge of the treated water is conducted together with the inflow of the wastewater, the water surface level of the reaction tank 110 undergoes no substantial fluctuation.

The raw water introduction line 112 that constitutes part of the raw water introduction device is connected to the inflow ports 126 from outside the reaction tank 110. The raw water pump 114 and the electromagnetic valve 116 that constitute part of the raw water introduction device are installed in the raw water introduction line 112. The raw water pump 114 and the electromagnetic valve 116 are connected electrically to the control device 124. The raw water introduction device is not limited to the device configuration described above, provided it has the function of supplying the wastewater to the inflow ports 126 provided in the reaction tank 110.

Figure 15:
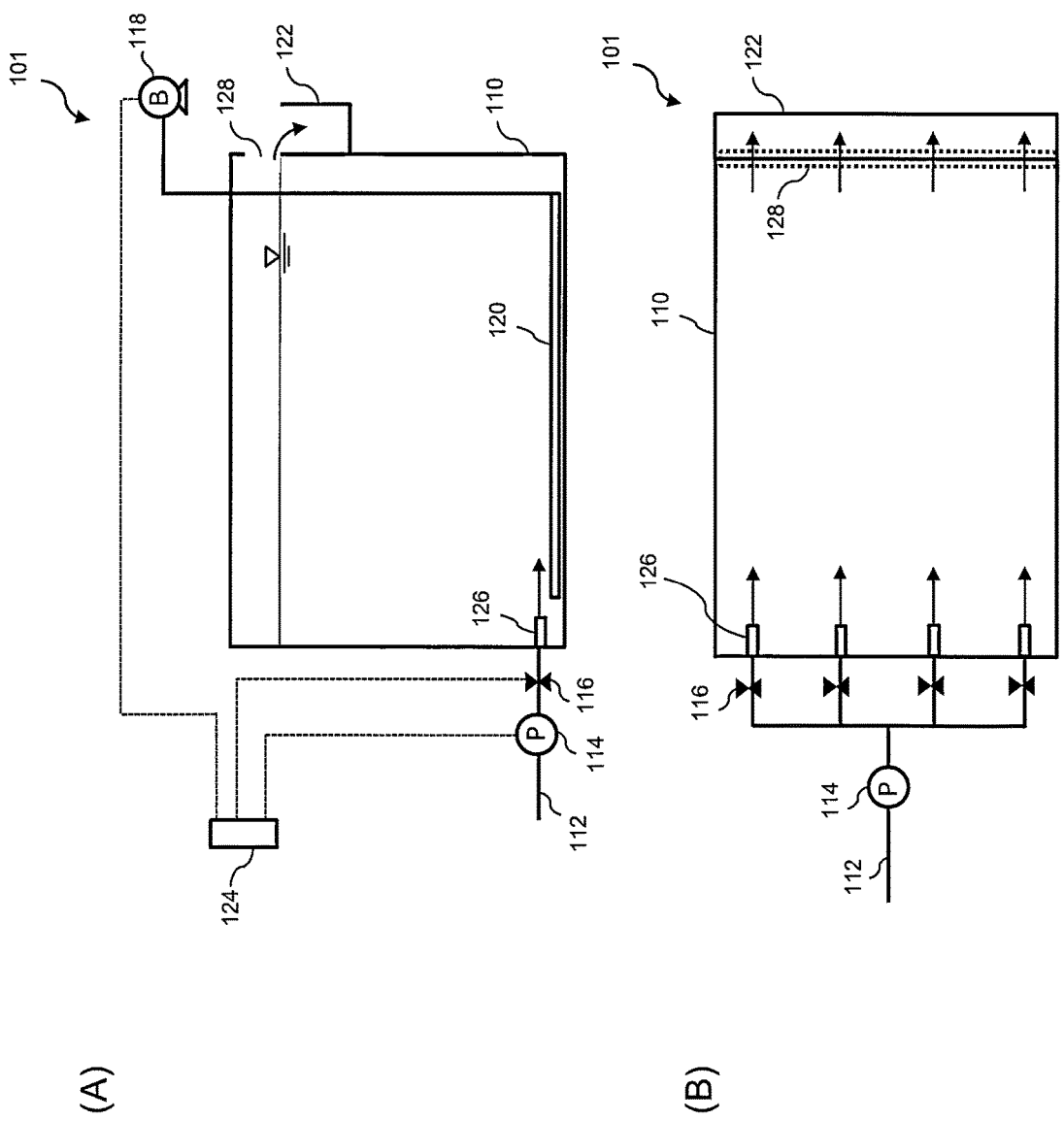
FIG. 15(A) is a schematic cross-sectional view illustrating one example of a water treatment device according to an embodiment of the present invention, and (B) is a schematic top view illustrating one example of a water treatment device according to an embodiment of the present invention.

The treated water collection channel 122 illustrated in FIG. 15 is installed on the outside of the reaction tank 110, and is connected to the interior of the reaction tank 110 via the discharge port 128 provided in the reaction tank 110.

The blower 118 that constitutes part of the aeration device is connected to the aeration line 120, and an aeration gas such as oxygen or air is fed into the aeration line 120 by the blower 118, with the aeration gas then supplied to the reaction tank 110 through the aeration line 120. As a result, the water inside the reaction tank 110 flows and is stirred. Although omitted from the drawing, a stirring device in which, for example, a stirring blade is rotated by the rotation of a motor may be installed in the reaction tank 110 to stir the water inside the reaction tank 110. The water treatment device 101 illustrated in FIG. 15 assumes biological treatment under aerobic conditions, but the device may also be applied to biological treatment under anaerobic conditions. In those cases where treatment is conducted under anaerobic conditions, a stirring device may be installed, but the aeration device need not be installed.

The control device 124 is composed, for example, of a microcomputer having a CPU that runs a program and ROM and RAM that store the program and calculations results, and an electrical circuit and the like, and has the functions of controlling the operation of the aeration device and the raw water introduction device.

An example of the operation of the water treatment device 101 of the present embodiment is described below.

The electromagnetic valve 116 is opened and the raw water pump 114 is activated by the control device 124, and the wastewater passes through the raw water introduction line 112 and flows into the reaction tank 110 from the inflow ports 126. It is preferable to introduce the biological sludge into the reaction tank 110 in advance.

Figure 16:
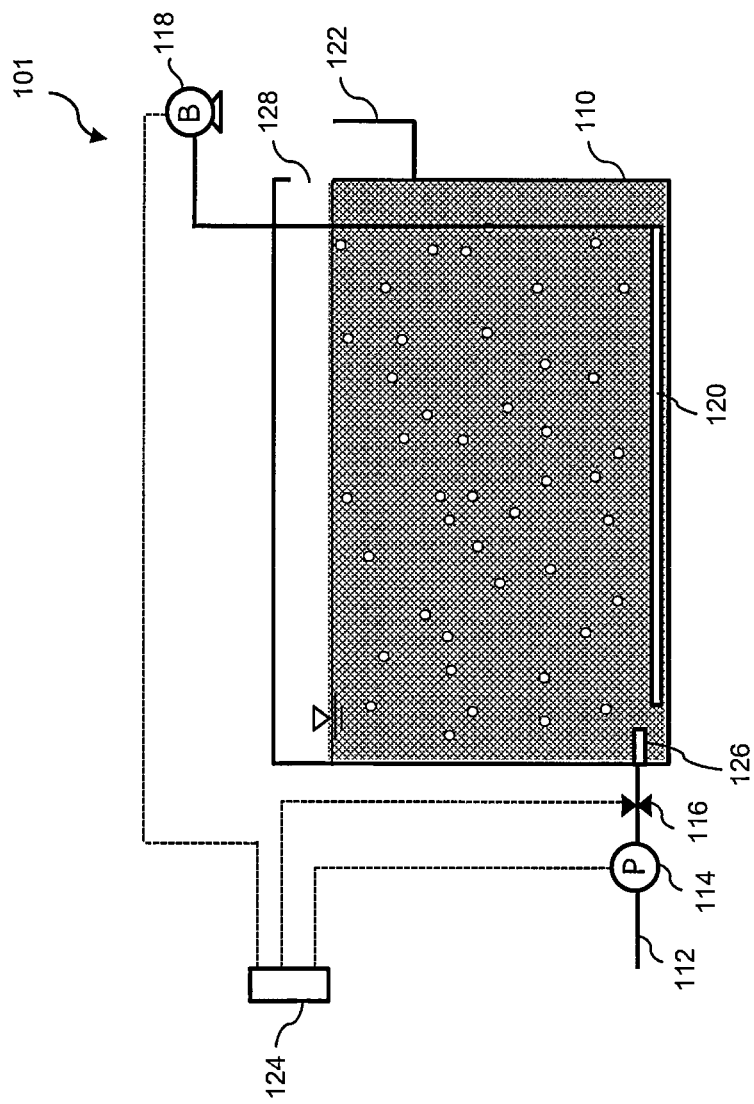
FIG. 16 is a schematic cross-sectional view illustrating one example of the state of the water treatment device during the biological treatment step.

FIG. 16 is a schematic cross-sectional view illustrating one example of the state of the water treatment device during the biological treatment step. Once the water level of the wastewater inside the reaction tank 110 has reached a prescribed level, the control device 124 closes the electromagnetic valve 116, stops operation of the raw water pump 114, and activates the blower 118. As a result, as illustrated in FIG. 16, the aeration gas is supplied from the aeration line 120 into the interior of the reaction tank 110, and the wastewater and biological sludge inside the reaction tank 110 are stirred. Then, the wastewater inside the reaction tank 110 is biologically treated by the biological sludge (the biological treatment step), and treatment target substances in the wastewater (such as organic matter and the like) are decomposed.

Figure 17:
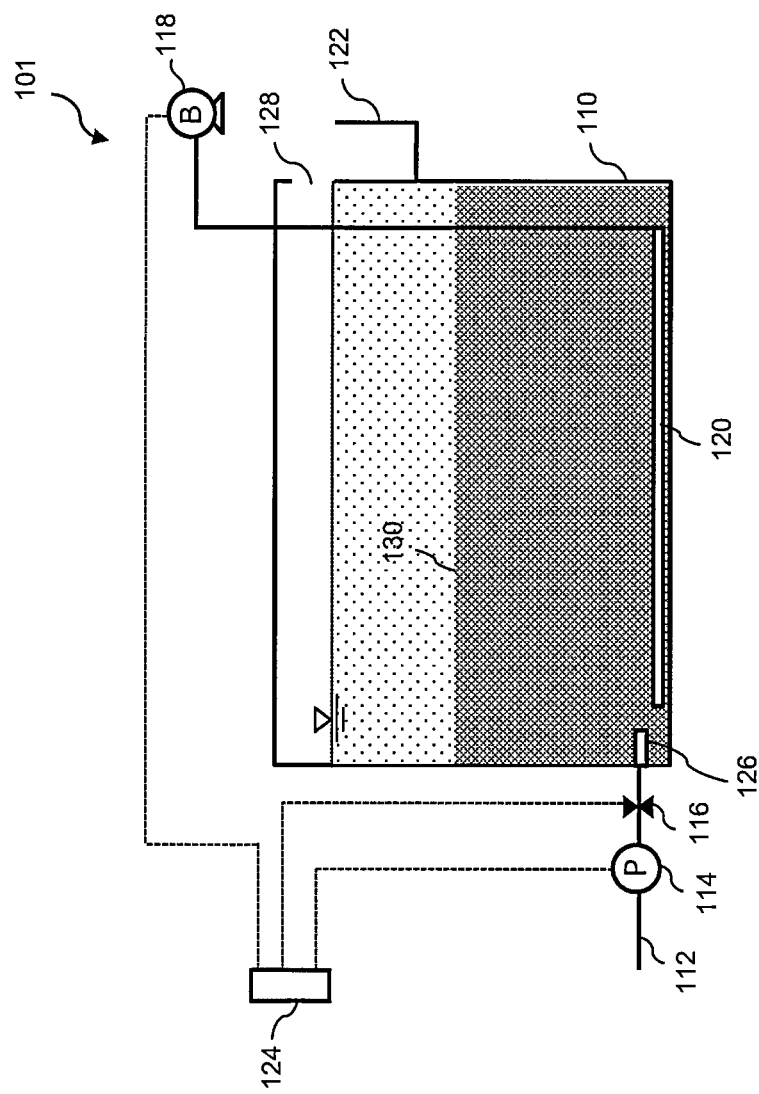
FIG. 17 is a schematic cross-sectional view illustrating one example of the state of the water treatment device during the settling step.

FIG. 17 is a schematic cross-sectional view illustrating one example of the state of the water treatment device during the settling step. After the biological treatment step has been conducted for a prescribed time, operation of the blower 118 is stopped by the control device 124, and the stirring and aeration of the wastewater inside the reaction tank 110 is stopped. As a result, as illustrated in FIG. 17, settling of the biological sludge occurs (the settling step), and a biological sludge bed 130 is formed in the bottom portion of the reaction tank 110.

Figure 18:
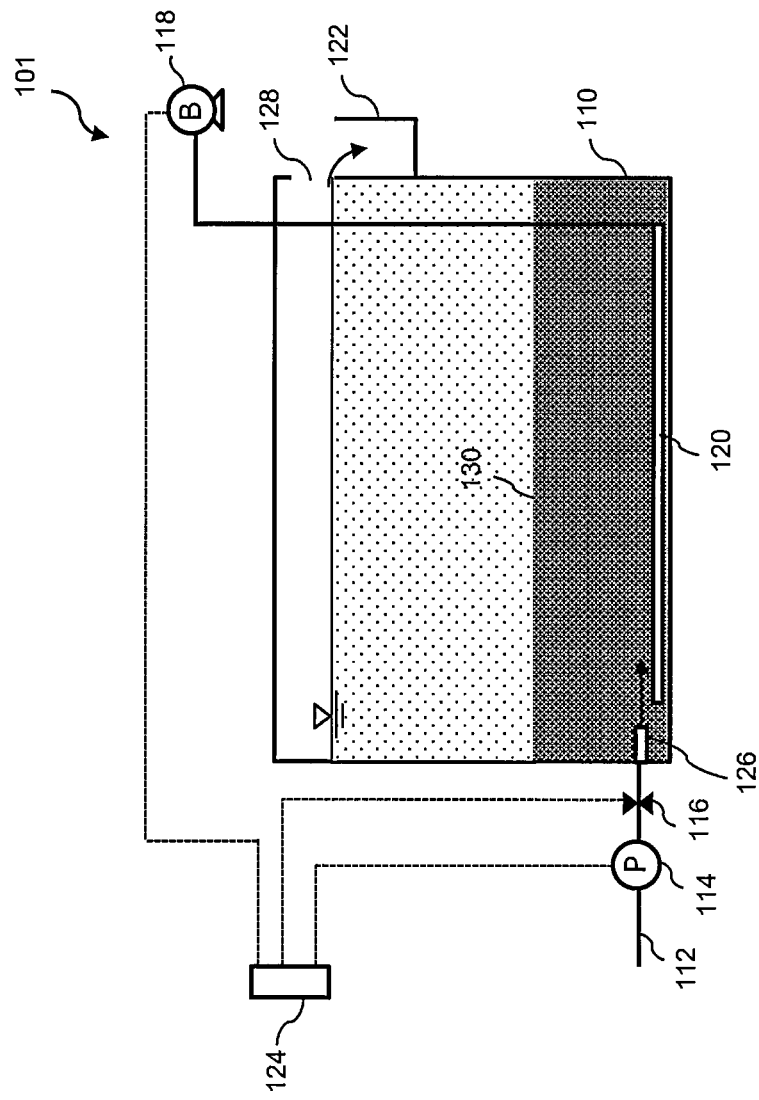
FIG. 18 is a schematic cross-sectional view illustrating one example of the state of the water treatment device during the inflow/discharge step.

FIG. 18 is a schematic cross-sectional view illustrating one example of the state of the water treatment device during the inflow/discharge step. After the settling step has been allowed to proceed for a prescribed time, forming the biological sludge bed 130 in the bottom portion of the reaction tank 110, the raw water pump 114 is activated and the electromagnetic valve 116 is opened by the control device 124 and wastewater is supplied from the raw water introduction line 112 to the inflow ports 126. As a result, as illustrated in FIG. 18, the wastewater is supplied from the inflow ports 126 into the biological sludge bed 130 in the horizontal direction, and the biologically treated water that has undergone biological treatment in the reaction tank 110 is discharged from the discharge port 128 into the treated water collection channel 122 (the inflow/discharge step). The treated water is discharged from the treated water collection channel 122 to a position outside the system of the water treatment device 101. Once the inflow/discharge step has been conducted for a prescribed time, the procedure returns to the biological treatment step described above. In other words, an operational cycle is conducted that repeats the inflow/discharge step, the biological treatment step and the settling step.

It is thought that extracellular polymeric substances (EPS) produced by the bacteria affect the formation of a biological sludge with superior settling properties (for example, a granulated biological sludge) in the above operational cycle. In order to form EPS, formation of a concentration gradient of the treatment target substances that undergo biological treatment in the reaction tank 110 is important. For example, in those cases where organic matter in the wastewater is subjected to biological treatment, formation of a concentration gradient of the organic matter is important, whereas in those cases where nitrogen-containing substances such as ammoniacal nitrogen and nitrate nitrogen are subjected to biological treatment, formation of a concentration gradient of the nitrogen-containing substances is important. The concentration gradient of the treatment target substances may be formed by increasing the concentration of the treatment target substances inside the reaction tank 110 in the inflow/discharge step (satiated state), and then consuming the treatment target substances inside the reaction tank 110, thereby reducing the concentration of the treatment target substances inside the reaction tank 110 in the biological treatment step (starved state). By supplying the wastewater in the manner described in the present embodiment, from the inflow ports 126 into the biological sludge bed 130 in a horizontal direction in the inflow/discharge step, a pathway for bringing the wastewater into contact with the biological sludge can be adequately ensured, and therefore the treatment target substances in the wastewater are more easily retained in the tank. Accordingly, in the inflow/discharge step, the concentration of treatment target substances retained in the reaction tank 110 can be effectively increased, meaning the concentration gradient of the treatment target substances inside the reaction tank 110 can be increased. As a result, a biological sludge having superior settling properties can be formed, thus enabling the biological treatment speed to be increased. In those cases where the wastewater is supplied into the biological sludge bed 130 as an upward flow (namely, when the wastewater is supplied into the biological sludge bed 130 in a vertical direction), if the thickness of the biological sludge bed 130 formed inside the reaction tank 110 does not have a certain degree of thickness, then a pathway for bringing the wastewater into contact with the biological sludge cannot be adequately ensured, and efficiently increasing the concentration of the treatment target substances retained inside the reaction tank 110 becomes difficult. However, in the case of the horizontal direction inflow used in the present embodiment, even in those cases where the thickness biological sludge bed 130 formed inside the reaction tank 110 is not large, compared with the case of the upward flow described above, a pathway for bringing the wastewater into contact with the biological sludge can be adequately ensured, and therefore the concentration of the treatment target substances retained inside the reaction tank 110 can be increased. Further, by using the water treatment device 101 of the present embodiment, unlike conventional water treatment devices, a distributor need not be installed within the wastewater inflow, meaning increases in equipment costs and running costs such as operational control costs can be suppressed. In particular, it is thought that applying the water treatment device 101 of the present embodiment to the water treatment device of a large-scale treatment facility will enable equipment costs and operational control costs to be effectively reduced.

The biological sludge of superior settling properties formed in the water treatment device 101 of the present embodiment may be used in its own biological treatment, or may be removed from the reaction tank 110 and supplied to another biological treatment tank. This other biological treatment tank may be a semibatch system similar to the present embodiment, or may be a continuous system in which the biological treatment is conducted while the wastewater is introduced in a continuous manner. This enables, for example, the biological treatment speed in another biological treatment to be increased. Further, the biologically treated water obtained from the water treatment device 101 of the present embodiment may be supplied to another biological treatment tank (having either a continuous system or a semibatch system). This enables, for example, the water quality of the biologically treated water to be further improved.

The operating conditions for the water treatment device of the present embodiment and modifications and the like of the water treatment device are described below.

Examples of wastewaters that may be treated using the water treatment device 101 of the present embodiment include wastewaters containing substances (treatment target substances) having biodegradability, such as food processing plant wastewater, chemical plant wastewater, semiconductor plant wastewater, machinery plant wastewater, sewage, human waste and river water. Examples of the substances having biodegradability include organic matter and nitrogen-containing substances such as ammoniacal nitrogen and nitrate nitrogen. For example, in the case where a wastewater containing organic matter is subjected to biological treatment, the organic matter in the wastewater is decomposed to carbon dioxide through contact with the biological sludge (microorganisms). Further, in the case where, for example, a wastewater containing nitrogen-containing substances is subjected to biological treatment, the nitrogen-containing substances in the wastewater are decomposed to form nitrogen gas through contact with the biological sludge (microorganisms).

In those cases where the wastewater that is treated using the water treatment device 101 of the present embodiment contains a large oil and fat content, the oil and fat may sometimes have an adverse effect on the biological treatment, and therefore it is preferable that, prior to supply to the reaction tank 110, the oil and fat content of the wastewater is reduced, for example, to not more than about 150 mg/L using a conventional technique such as flotation separation, flocculation pressure flotation or adsorption.

There are no particular limitations on the BOD concentration of the wastewater that is treated using the water treatment device 101 of the present embodiment. The BOD concentration in a wastewater in which it is generally considered difficult to form a biological sludge of superior settling properties is typically within a range from 50 to 200 mg/L, but by using the water treatment device 101 according to the present embodiment, even within this BOD concentration range, a biological sludge having superior settling properties can still be formed. For example, with the water treatment device 101 according to the present embodiment, a biological sludge that exhibits settling indicators including an SVI30 value of not more than 50 mL/g and an SVI5 value of not more than 70 mL/g can be formed.

Increasing the concentration of the treatment target substances in the reaction tank 110 in the inflow/discharge step (thereby further increasing the amount of treatment target substances inside the reaction tank 110 at the start of the biological treatment step) is effective in promoting granule formation, and therefore the retention ratio of the treatment target substances inside the reaction tank 110 in the inflow/discharge step is preferably at least 50%, and more preferably 70% or greater. This retention ratio of the treatment target substances inside the reaction tank 110 indicates the ratio of the concentration of the treatment target substances in the tank at the completion of the inflow/discharge step relative to the concentration of the treatment target substances in the wastewater.

There are no particular limitations on the installation positions of the inflow ports 126, provided the positions are lower than the interface position of the biological sludge bed 130 formed in the bottom portion of the reaction tank 110 in the settling step, but if the assumptions are made that the height of the reaction tank 110 is usually designed with an effective water depth of 2 m to 8 m, and operations are typically conducted with the interface height of the biological sludge bed 130 at 10% to 50% of the height of the reaction tank 110, then the inflow ports 126 are preferably installed at positions within a height of 4 m from the bottom of the reaction tank 110, more preferably installed at positions within a height of 2 m from the bottom of the reaction tank 110, and even more preferably installed at positions within a height of 1 m from the bottom of the reaction tank 110.

The wastewater inflow ratio is, for example, preferably within a range from at least 10% to not more than 100%. The wastewater inflow ratio is the ratio of the amount of wastewater introduced in a single operational cycle relative to the effective volume inside the reaction tank 110. In order to increase the concentration of treatment target substances retained in the reaction tank 110, increasing the wastewater inflow ratio as much as possible is ideal, but on the other hand, the more the wastewater inflow ratio is increased, the greater the possibility of a deterioration in the treated water due to short pass of the wastewater. Accordingly, in light of these circumstances, the wastewater inflow ratio is more preferably within a range from at least 20% to not more than 80%. However, if a treatment device such as an activated sludge tank is installed downstream from the reaction tank 110, then provided the water quality of the final treated water obtained after this latter-stage treatment device does not deteriorate, there are no particular limitations on the wastewater inflow ratio, and for example, a value exceeding 100% is possible. In those cases where the wastewater inflow ratio exceeds 100%, the upper limit for the wastewater inflow ratio is preferably set to not more than 200% in order to suppress any reduction in the number of operational cycles.

The inflow/discharge step time is determined, for example, in accordance with the wastewater inflow ratio and the flow rate of the wastewater into the reaction tank 110. However, if the water area load of the reaction tank 110, calculated by dividing the flow rate of the wastewater into the reaction tank 110 by the horizontal cross-sectional area of the reaction tank 110, is set to a high value, then the light sludge fraction within the sludge can be selectively discharged from the system while the sludge fraction having superior settling properties can be retained inside the tank, meaning the formation of a biological sludge of superior settling properties is promoted, but there is a possibility that, in the startup period and the like when the settling properties of the sludge are not favorable, the sludge may flow out of the tank, resulting in a deterioration in the biological treatment functionality. On the other hand, if the water area load of the reaction tank 110 is set to a low value, then the sludge selection effect weakens, and moreover in those cases where the wastewater inflow ratio is increased, the inflow/discharge step time may lengthen, and there is a possibility that formation of a sludge having superior settling properties may become difficult. In light of these circumstances, the water area load on the reaction tank 110 is preferably at least 0.5 m/h but not more than 20 m/h, and is more preferably within a range from at least 1 m/h to not more than 10 m/h. Further, in those cases where the water area load of the reaction tank 110 can be set to a higher value due to an improvement in the settling properties of the biological sludge inside the tank, the water area load of the reaction tank 110 may be increased in accordance with the settling properties of the biological sludge, and the inflow/discharge step time may also be shortened in accordance with the water area load and the wastewater inflow ratio.

In terms of factors such as maintaining the integrity (the settling properties and the activity and the like) of the sludge, the sludge concentration inside the reaction tank 110 in the biological treatment step is, for example, preferably within a range from 1,500 to 30,000 mg/L. Further, in terms of maintaining the sludge integrity and the like, the sludge load is preferably within a range from 0.05 to 0.60 kg-BOD/kg-MLSS/day, and is more preferably within a range from 0.1 to 0.5 kg-BOD/kg-MLSS/day. The biological treatment step time is set so that, for example, the sludge load falls within the above range. In cases where the sludge load exceeds the above range or cases where the sludge concentration exceeds the above range, some biological sludge is preferably extracted from the reaction tank 110.

The pH inside the reaction tank 110 is preferably set to a value within the range suitable for most microorganisms, and for example, is preferably within a range from 6 to 9, and more preferably from 6.5 to 7.5. If the pH value falls outside this range, then a pH adjustment is preferably performed by adding an acid or alkali to achieve a pH within the above range. The dissolved oxygen (DO) in the reaction tank 110, under aerobic conditions, is preferably at least 0.5 mg/L, and particularly preferably 1 mg/L or greater.

There are no particular limitations on the time of the settling step, provided the time extends from the end of the biological treatment step until the biological sludge bed 130 is formed in the bottom portion of the reaction tank 110, but the time is preferably sufficient for the height of the sludge interface of the biological sludge bed 130 to reach a height that is within a range from 10% to 50% of the height of the reaction tank 110.

The shape of the reaction tank 110 is not limited to the type of rectangular shape illustrated in FIG. 15, and for example, may be a circular cylindrical shape or the like. A rectangular reaction tank 110 is employed, for example, in large-scale treatment plants such as sewage treatment plants or the like. One example of a rectangular reaction tank employed in a large-scale treatment plant is described below.

Figure 19:
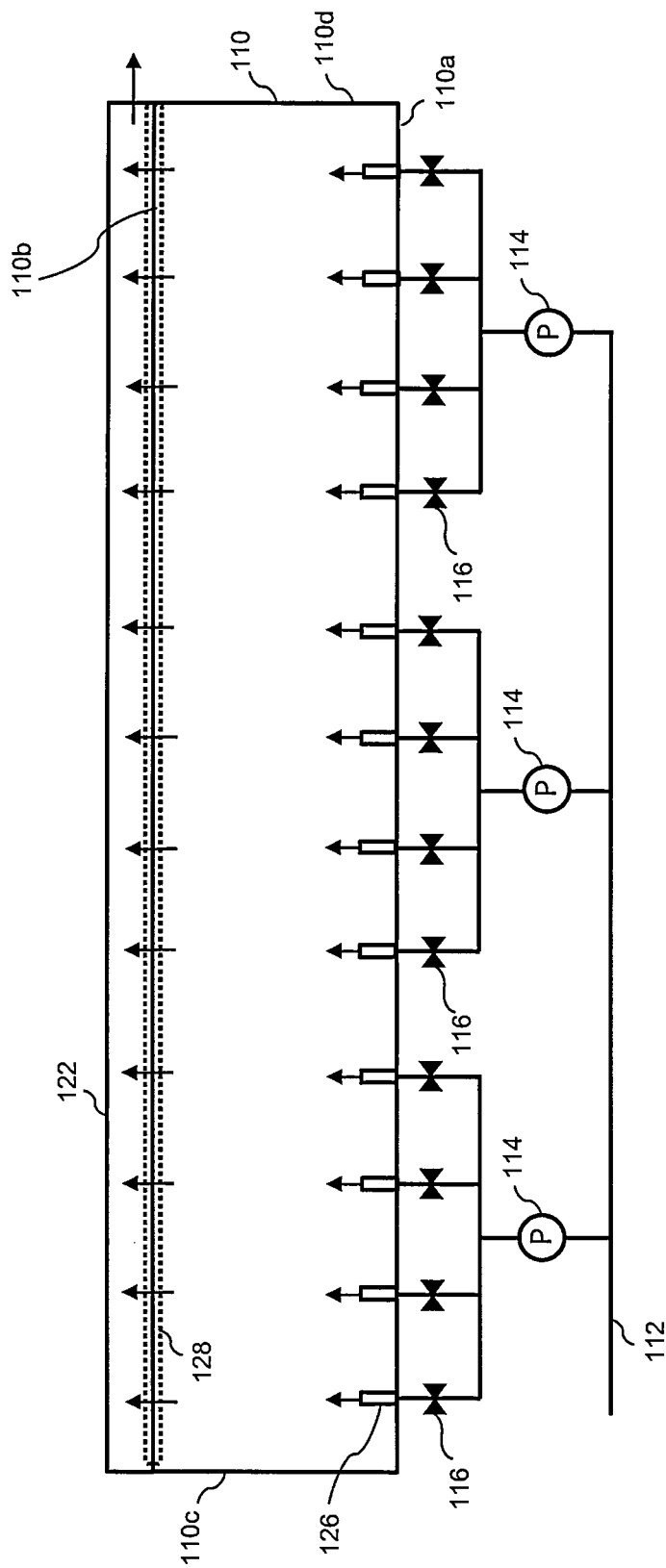
FIG. 19 is a schematic top view illustrating one example of a rectangular reaction tank employed in a large-scale treatment plant.

FIG. 19 is a schematic top view illustrating one example of a rectangular reaction tank employed in a large-scale treatment plant. The rectangular reaction tank 110 illustrated in FIG. 19 is a rectangular reaction tank which, when viewed in a horizontal cross-section, has a pair of opposing long side walls (110a and 110b) and a pair of opposing short side walls (110c and 110d). A plurality of inflow ports 126 are installed in one long side wall 110a of the reaction tank 110, and a discharge port 128 is provided in the other long side wall 110b of the reaction tank 110. Further, a treated water collection channel 122 is provided outside the long side wall 110b, and the treated water collection channel 122 is connected to the interior of the reaction tank 110 via the discharge port 128. Although omitted from the illustration in the drawings, the discharge port 128 is disposed at the water surface level inside the reaction tank 110, and the inflow ports 126 are disposed at positions lower than the interface position of the biological sludge bed formed in the bottom portion of the reaction tank 110 during the settling step. The wastewater is supplied from the inflow ports 126 into the biological sludge bed in a horizontal direction.

In the case of the reaction tank 110 employed in a large-scale treatment plant, the ratio of the horizontal surface area of the reaction tank 110 relative to the effective water depth of the reaction tank 110 tends to increase. For example, in a rectangular reaction tank employed in a large-scale treatment plant, the value of [(length of long side wall+length of short side wall)/effective water depth] is preferably at least 1 m/m, and more preferably 1.8 m or greater. However, in a conventional water treatment device in which the wastewater is introduced into the reaction tank 110 in an upward flow using a distributor, if a reaction tank for which the value of [(length of long side wall+length of short side wall)/effective water depth] is 1 m/m or greater is employed, then in terms of the diffusibility of the wastewater and maintenance of the distributor and the like, there is a possibility that the equipment costs and operational control costs may increase dramatically. In contrast, when a reaction tank for which the value of [(length of long side wall+length of short side wall)/effective water depth] is 1 m/m or greater is employed in the water treatment device in the present embodiment, because a distributor need not be installed, any increases in the equipment costs and operational control costs can be suppressed compared with the case of the conventional water treatment device described above. Accordingly, the water treatment device of the present embodiment is particularly suitable as the water treatment device for a large-scale treatment facility.

In terms of the installation locations for the inflow ports 126 and the discharge port 128, it is preferable that the inflow ports 126 are installed in one long side wall 110a, and the discharge port 128 is installed in the other long side wall 110b. If the inflow ports 126 are installed in one short side wall 110c, and the discharge port 128 is installed in the other short side wall 110d, then compared with the case where the inflow ports 126 and the discharge port 128 is installed in the long side walls (110a and 110b), the horizontal distance from the inflow ports 126 to the discharge port 128 lengthens, and therefore the contact efficiency between the wastewater and the biological sludge bed may deteriorate, which may sometimes lead to a reduction in the concentration of the treatment target substances retained inside the reaction tank 110.

In terms of suppressing any reduction in the concentration of the treatment target substances retained inside the reaction tank 110, the horizontal distance from the inflow ports 126 to the discharge port 128 is, for example, preferably not more than 10 m, and more preferably 6 m or less. If the horizontal distance from the inflow ports 126 to the discharge port 128 exceeds 10 m, then achieving efficient contact between the wastewater and the biological sludge bed may become difficult, which may sometimes lead to a reduction in the concentration of treatment target substances retained inside the reaction tank 110.

Figure 20:
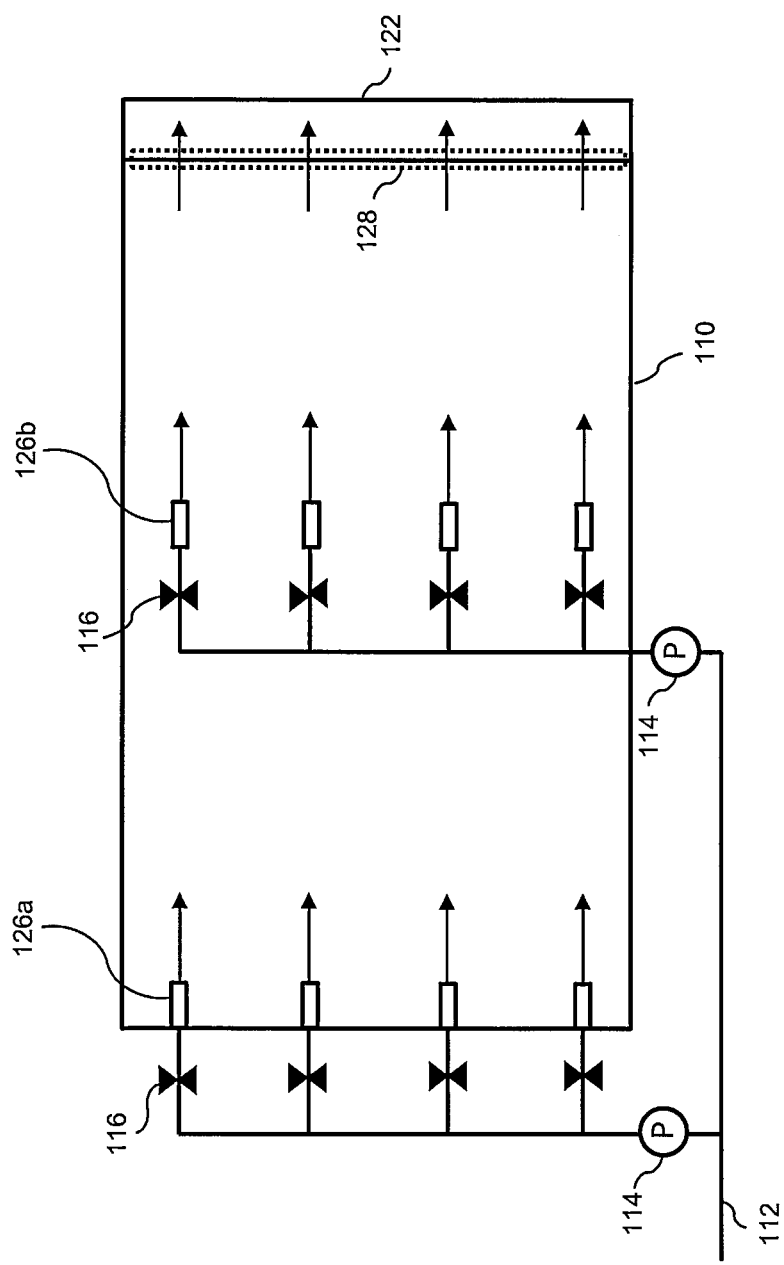
FIG. 20 is a schematic top view illustrating another example of a rectangular reaction tank employed in a large-scale treatment plant.

FIG. 20 is a schematic top view illustrating another example of a rectangular reaction tank employed in a large-scale treatment plant. The reaction tank 110 illustrated in FIG. 20 has first inflow ports 126a provided in one side surface of the reaction tank 110, and second inflow ports 126b provided between the first inflow ports 126a and the discharge port 128. Each of the inflow ports (126a and 126b) is disposed at a position lower than the interface position of the biological sludge bed formed in the bottom portion of the reaction tank 110 during the settling step.

Figure 21:
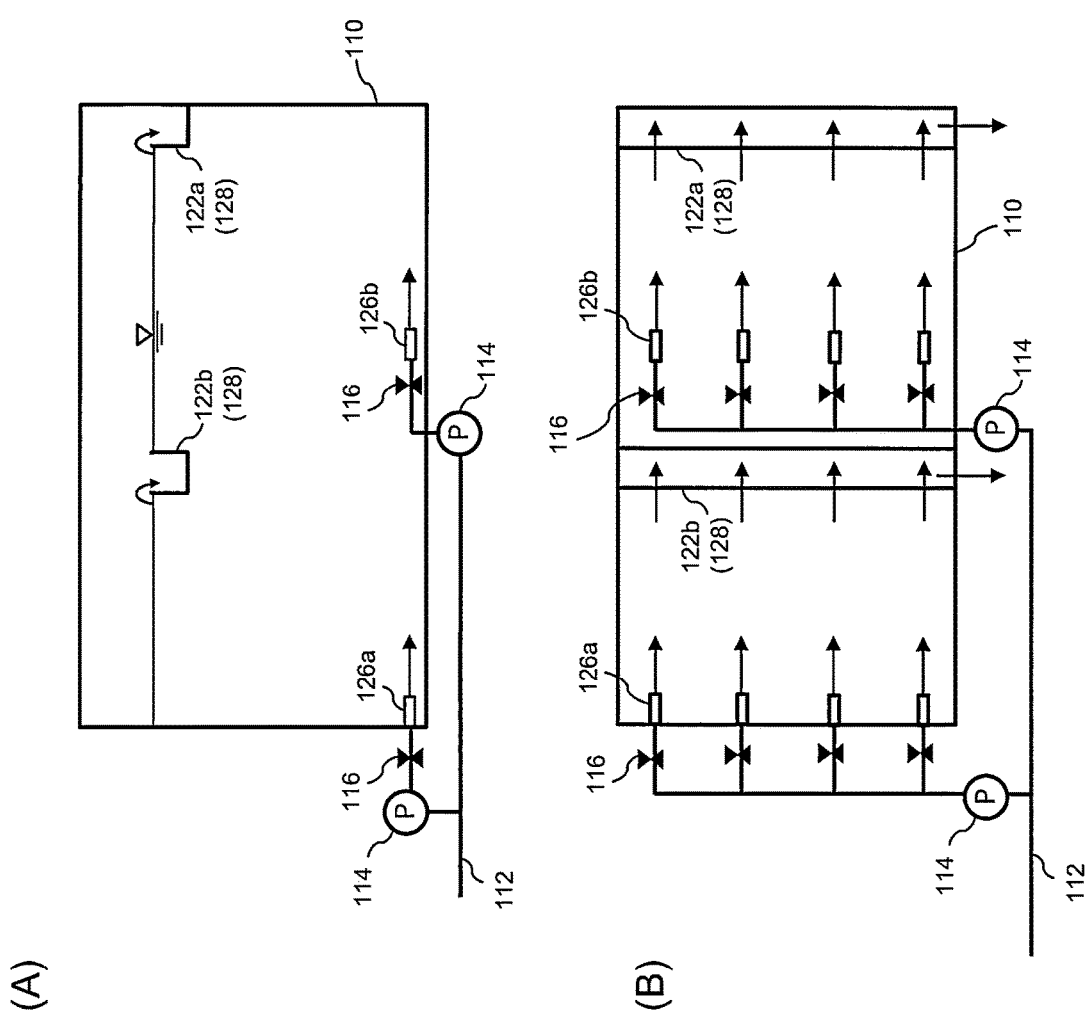
FIG. 21(A) is a schematic cross-sectional view illustrating another example of a rectangular reaction tank employed in a large-scale treatment plant, and (B) is a schematic top view illustrating another example of a rectangular reaction tank employed in a large-scale treatment plant.

FIG. 21(A) is a schematic cross-sectional view illustrating another example of a rectangular reaction tank employed in a large-scale treatment plant, and FIG. 21(B) is a schematic top view illustrating another example of a rectangular reaction tank employed in a large-scale treatment plant. The reaction tank 110 illustrated in FIG. 21 is provided with the first inflow ports 126a and the second inflow ports 126b described above. Further, a first treated water collection channel 122a and a second treated water collection channel 122b are installed inside the reaction tank 110. The first treated water collection channel 122a is installed on the inside of the side surface of the reaction tank 110 on the opposite side from the first side surface in which the first inflow ports 126a are provided, whereas the second treated water collection channel 122b is provided between the first treated water collection channel 122a and the first inflow ports 126a. The treated water in the reaction tank 110 illustrated in FIG. 21 overflows the side wall of the first treated water collection channel 122a and the second treated water collection channel 122b, flows into the first treated water collection channel 122a and the second treated water collection channel 122b, and is discharged outside the reaction tank 110. In other words, the first treated water collection channel 122a and the second treated water collection channel 122b illustrated in FIG. 21 function as the component that has until this point been described as the discharge port 128.

In those cases where the horizontal distance lengthens between the inflow ports provided in a first side surface of the reaction tank and the discharge port provided at the side surface opposite the first side surface, it is preferable that, as illustrated in the reaction tank 110 of FIG. 20 or FIG. 21, one or more inflow ports or discharge ports are provided between the inflow ports provided in the first side surface of the reaction tank and the discharge port provided at the side surface opposite the first side surface. As a result, the contact efficiency between the wastewater and the biological sludge bed improves, meaning the concentration of the treatment target substances retained in the reaction tank can be more easily increased.

Figure 24:
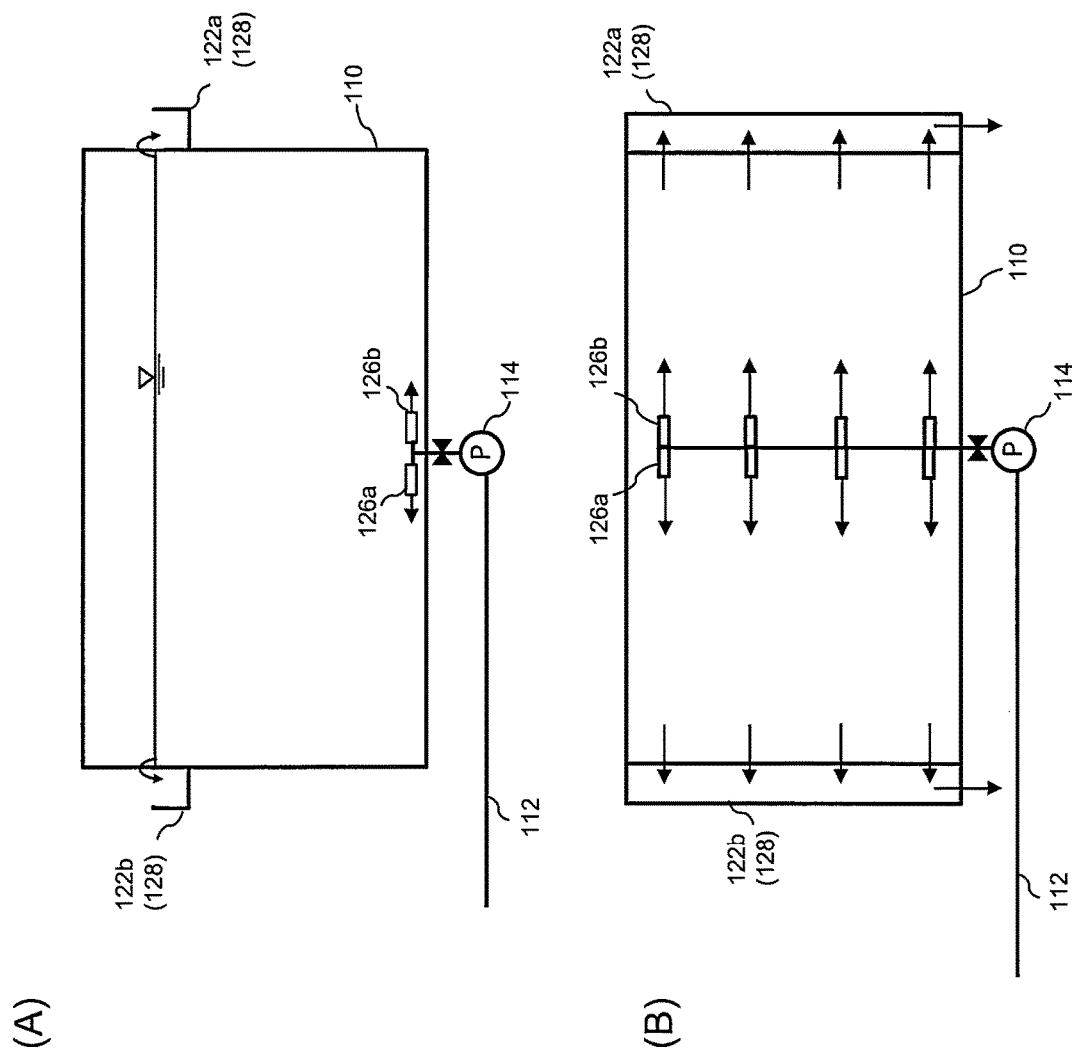
FIG. 24(A) is a cross-sectional view illustrating another example of a water treatment device of an embodiment of the present invention, and (B) is a schematic top view illustrating another example of a water treatment device of an embodiment of the present invention.

FIG. 24(A) is a cross-sectional view illustrating another example of a water treatment device of an embodiment of the present invention, and FIG. 24(B) is a schematic top view illustrating another example of a water treatment device of an embodiment of the present invention. In FIG. 24(B), the aeration device containing the blower 118 and the aeration line 120, and the control device 124 are omitted. In FIG. 24, the raw water introduction line 112 is introduced into the central portion of the reaction tank 110, and branches into a plurality of wastewater inflow ports (126a and 126b) inside the reaction tank 110. Treated water collection channels (122a and 122b) are installed at two opposing side surfaces of the reaction tank 110. The ejection ports of the wastewater inflow ports (126a and 126b) are installed facing the respective treated water collection channels (122a and 122b). In order to increase the retention ratio of the treatment target substances during the inflow/discharge step, the inflow port flow rate, calculated from the distance from the inflow port to the opposing side surface of the reaction tank, is preferably increased to at least a certain value. On the other hand, in those cases where the distance from the inflow port to the opposing side surface of the reaction tank is large, and maintaining the flow rate at a high value is difficult, employing the present embodiment enables the distance from the inflow ports to the discharge port to be shortened, so that even in those cases where the flow rate through the inflow ports is low, the retention ratio for the treatment target substances during the inflow/discharge step can still be increased.

Figure 22:
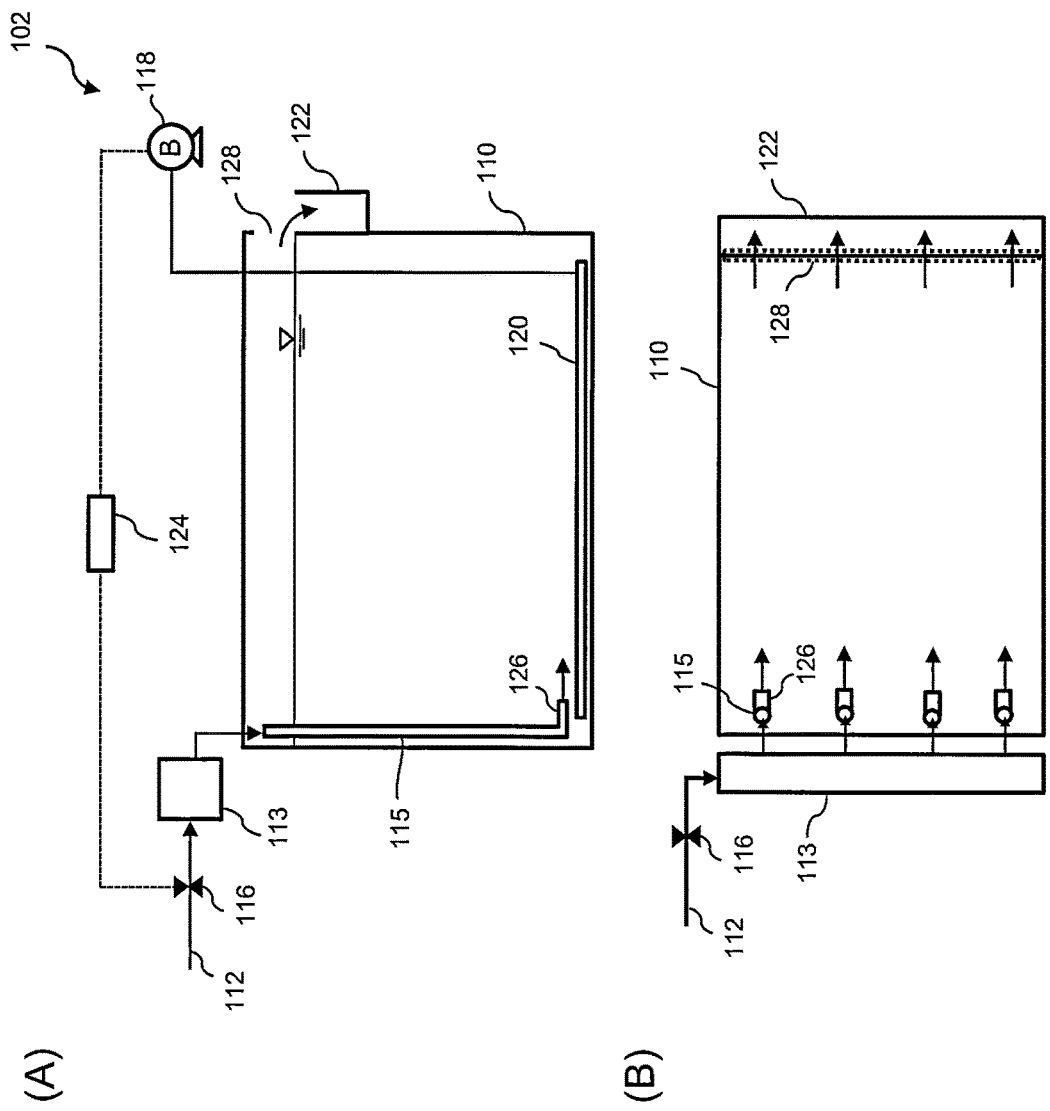
FIG. 22(A) is a schematic cross-sectional view illustrating another example of a water treatment device of an embodiment of the present invention, and (B) is a schematic top view illustrating another example of a water treatment device of an embodiment of the present invention.

FIG. 22(A) is a schematic cross-sectional view illustrating another example of a water treatment device of an embodiment of the present invention, and FIG. 22(B) is a schematic top view illustrating another example of a water treatment device of an embodiment of the present invention. In FIG. 22(B), the aeration device containing the blower 118 and the aeration line 120, and the control device 124 are omitted. In the water treatment device 102 illustrated in FIG. 22, those components that are the same as those of the wastewater treatment device 101 illustrated in FIG. 15 are labeled with the same reference signs, and description of those components is omitted. The water treatment device 102 illustrated in FIG. 22 includes a distribution channel 113 and raw water lines 115. The raw water introduction line 112 is connected to the top end of the raw water lines 115 via the distribution channel 113. The raw water lines 115 are lines that extend in the vertical direction, and have a top end positioned above the water surface level inside the reaction tank 110, and a bottom end that is connected to an inflow port 126. In this description, the expression that the lines extend in the vertical direction includes cases where the lines extend in a substantially vertical direction. The expression "substantially vertical direction" includes all directions having an angle of inclination within 30° C. of the vertical direction. The raw water lines 115 may also be provided outside the reaction tank 110.

In the inflow/discharge step in the water treatment device 102 illustrated in FIG. 22, the electromagnetic valve 116 is opened by the control device 124, and the wastewater is supplied to the raw water lines 115 from the raw water introduction line 112 via the distribution channel 113. The wastewater then flows down the inside of the raw water lines 115 due to gravity, and is supplied in a horizontal direction from the inflow ports 126 into the biological sludge bed formed inside the reaction tank 110. Further, as a result of the inflow of the wastewater into the reaction tank 110, the biologically treated water inside the reaction tank 110 is discharged from the discharge port 128 into the treated water collection channel 122. In this manner, in the water treatment device 102 illustrated in FIG. 22, the wastewater can be introduced by gravity into the reaction tank 110, without using a pump, and therefore a reduction in operating costs can be achieved, and the device is ideally suited, for example, to a sewage treatment plant or the like dealing with a large volume of treated water.

Figure 23:
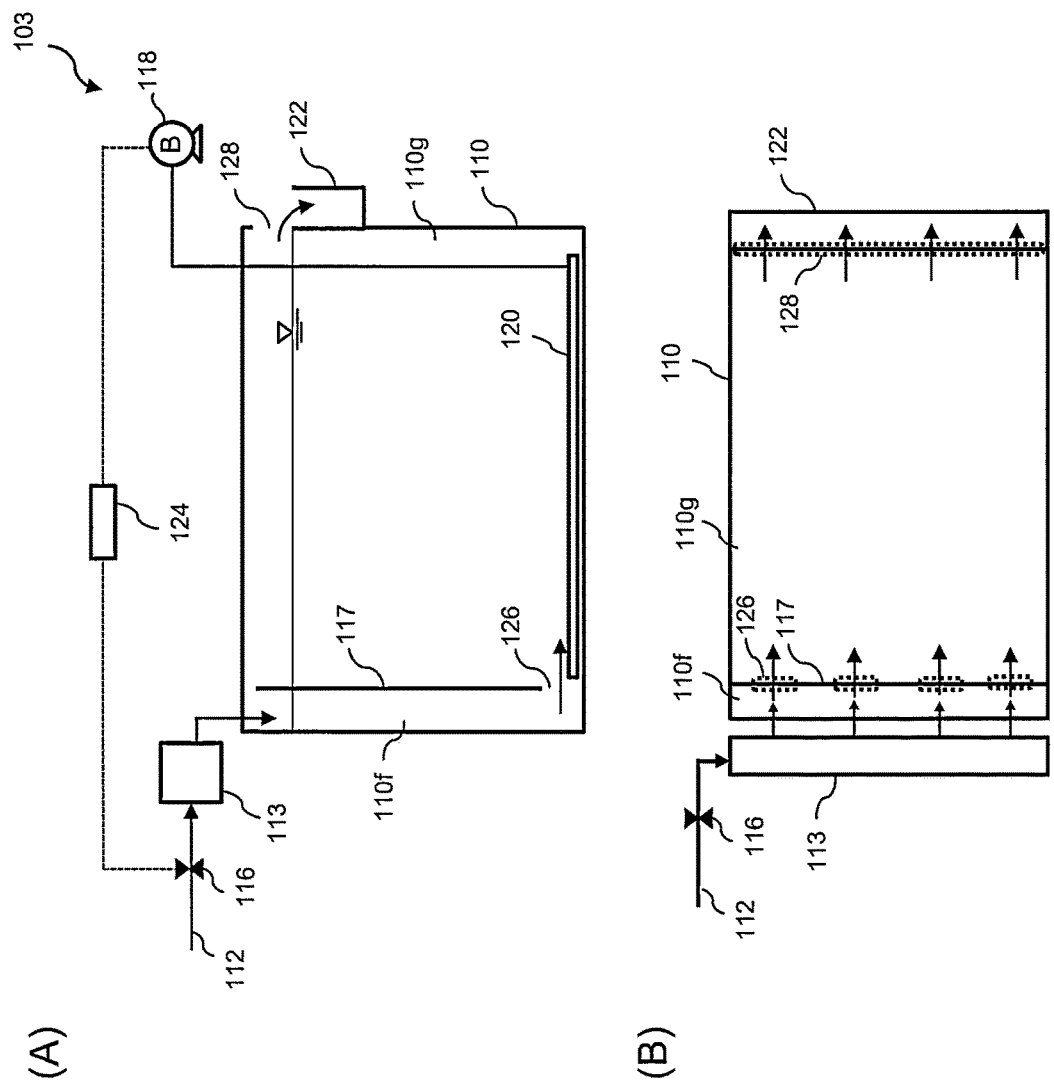
FIG. 23(A) is a schematic cross-sectional view illustrating another example of a water treatment device of an embodiment of the present invention, and (B) is a schematic top view illustrating another example of a water treatment device of an embodiment of the present invention.

FIG. 23(A) is a schematic cross-sectional view illustrating another example of a water treatment device of an embodiment of the present invention, and FIG. 23(B) is a schematic top view illustrating another example of a water treatment device of an embodiment of the present invention. In FIG. 23(B), the aeration device containing the blower 118 and the aeration line 120, and the control device 124 are omitted. In the water treatment device 103 illustrated in FIG. 23, those components that are the same as those of the wastewater treatment device 101 illustrated in FIG. 15 are labeled with the same reference signs, and description of those components is omitted. The water treatment device 103 illustrated in FIG. 23 has a distribution channel 113 and a partition wall 117. The partition wall 117 is installed along the vertical direction inside the reaction tank 110, and divides the inside of the reaction tank 110 into a first chamber 110f and a second chamber 110g. An opening that connects the first chamber 110f and the second chamber 110g is provided at the bottom of the partition wall 117, and this opening functions as the component that has until this point been described as the inflow port 126. The discharge port 128 is provided at the side surface of the second chamber 110g, and is connected to the treated water collection channel 122 provided outside the second chamber 110g.

In the reaction tank 110 illustrated in FIG. 23, the first chamber 110f divided by the partition wall 117 functions as a chamber for receiving the wastewater, and the second chamber 110g divided by the partition wall 117 functions as a chamber in which the aforementioned operational cycle (the inflow/discharge step, biological treatment step, and settling step) is conducted.

In the inflow/discharge step in the water treatment device 103 illustrated in FIG. 23, the electromagnetic valve 116 is opened by the control device 124, and the wastewater is supplied to first chamber 110f from the raw water introduction line 112 via the distribution channel 113. The wastewater then passes through the first chamber 110f, and is supplied in a horizontal direction from the inflow port 126 into the biological sludge bed formed in the bottom portion of the second chamber 110g. Further, as a result of the inflow of the wastewater into the second chamber 110g, the biologically treated water inside the second chamber 110g is discharged from the discharge port 128 into the treated water collection channel 122. Furthermore, following the inflow/ discharge step, the biological treatment step and the settling step are conducted inside the second chamber 110g.

There are no particular limitations on the shape of the opening (the inflow port 126) provided in the partition wall 117, and the opening may be rectangular, circular or oval-shaped or the like. Further, at least one opening (inflow port 126) is formed in the partition wall 117.

Although there are no particular limitations on the installation position of the partition wall 117, in terms of factors such as ensuring that the wastewater can effectively contact the biological sludge bed inside the second chamber 110g, the partition wall 117 is preferably installed so that the ratio of the width of the first chamber 110f when viewed in a vertical cross-section of the reaction tank 110 relative to the width of the second chamber 110g is not more than 1/2, and the partition wall 117 is more preferably installed so that this ratio is 1/5 or less.

Figure 25:
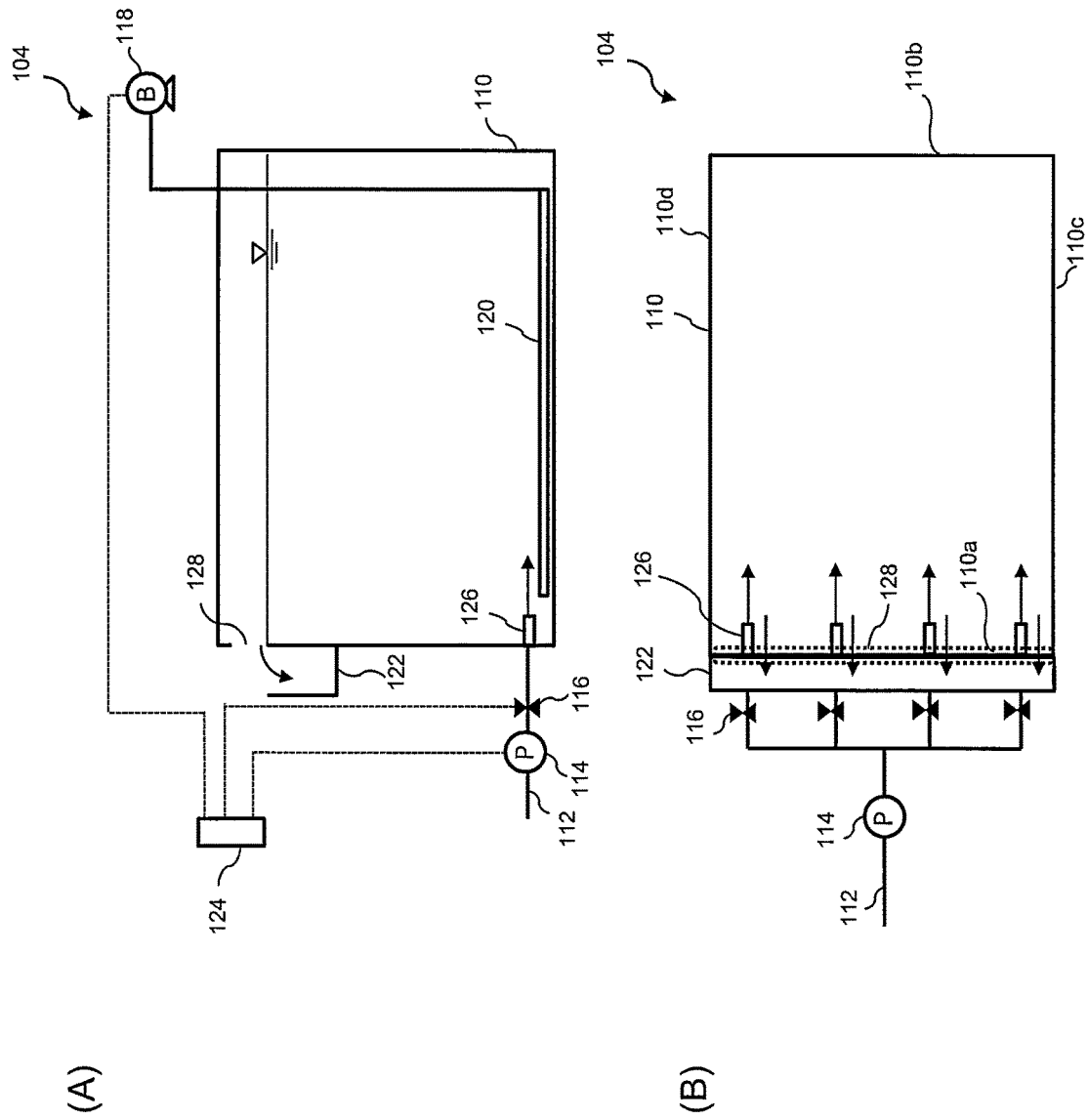
FIG. 25(A) is a schematic cross-sectional view illustrating another example of a water treatment device of an embodiment of the present invention, and (B) is a schematic top view illustrating another example of a water treatment device of an embodiment of the present invention.

FIG. 25(A) is a schematic cross-sectional view illustrating another example of a water treatment device of an embodiment of the present invention, and FIG. 25(B) is a schematic top view illustrating another example of a water treatment device of an embodiment of the present invention. In FIG. 25(B), the aeration device containing the blower 118 and the aeration line 120, and the control device 124 are omitted. In the water treatment device 104 illustrated in FIG. 25, those components that are the same as those of the wastewater treatment device 101 illustrated in FIG. 15 are labeled with the same reference signs, and description of those components is omitted. The reaction tank 110 illustrated in FIG. 25, when viewed in a horizontal cross-section, is a rectangular reaction tank with a pair of opposing walls (110a and 110b) and another pair of opposing walls (110c and 110d). A plurality of inflow ports 126 and the discharge port 128 are installed in one long side wall 110a of the reaction tank 110. The discharge port 128 is disposed at the water surface level of the inside the reaction tank 110, and the inflow ports 126 are disposed at positions lower than the interface position of the biological sludge bed formed in the bottom portion of the reaction tank 110 during the settling step. The wastewater is supplied from the inflow ports 126 into the biological sludge bed in a horizontal direction. By installing the inflow ports 126 and the discharge port 128 in the same wall surface, when the wastewater that is jetted from the inflow ports 126 into the settled sludge with at least a certain flow rate reaches the wall surface on the opposite side from the inflow ports, the wastewater cannot simply rise toward the discharge port in an upward flow, meaning short pass of the treatment target substances can be prevented.

Figure 26:
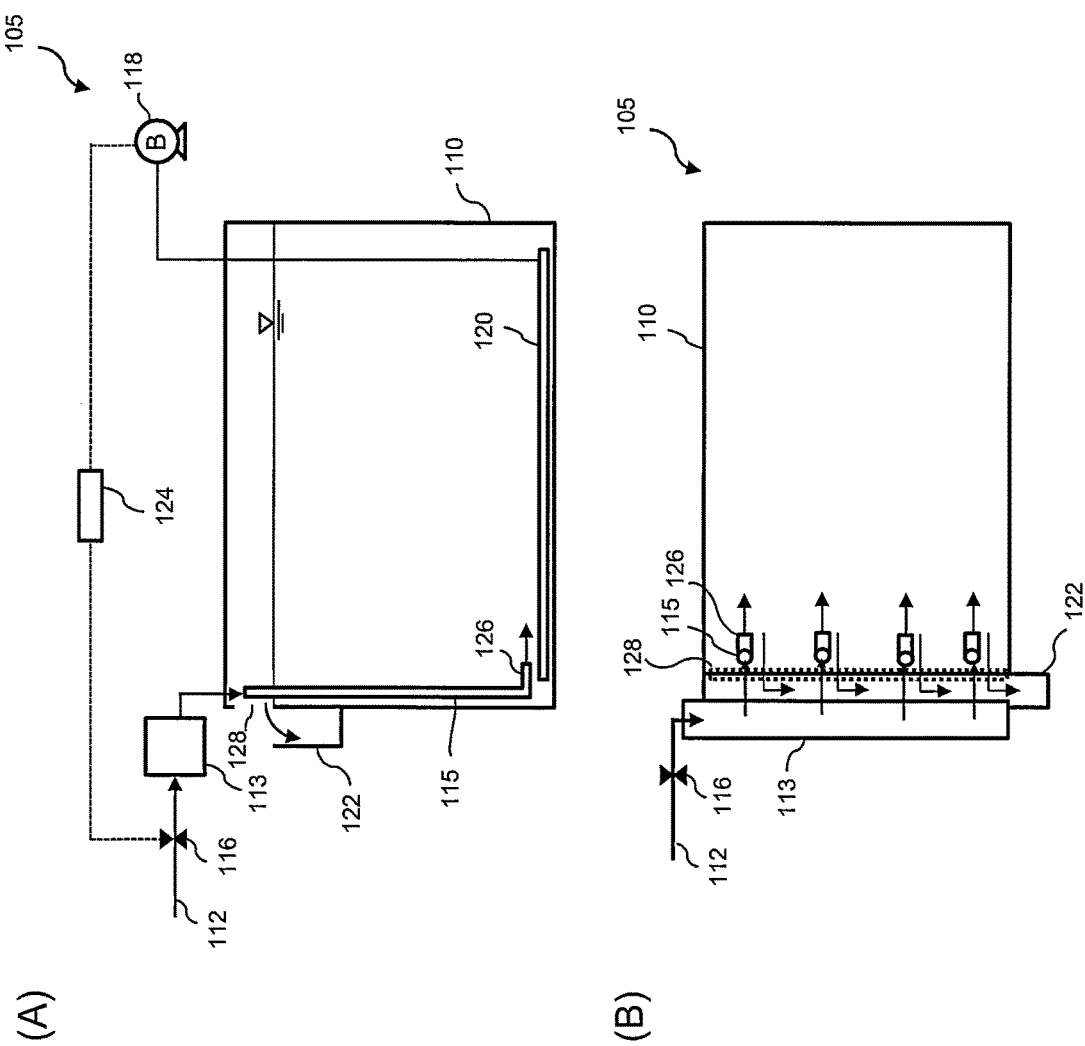
FIG. 26(A) is a schematic cross-sectional view illustrating another example of a water treatment device of an embodiment of the present invention, and (B) is a schematic top view illustrating another example of a water treatment device of an embodiment of the present invention.

FIG. 26(A) is a schematic cross-sectional view illustrating another example of a water treatment device of an embodiment of the present invention, and FIG. 26(B) is a schematic top view illustrating another example of a water treatment device of an embodiment of the present invention. In FIG. 26(B), the aeration device containing the blower 118 and the aeration line 120, and the control device 124 are omitted. In the water treatment device 105 illustrated in FIG. 26, those components that are the same as those of the wastewater treatment device 101 illustrated in FIG. 15 are labeled with the same reference signs, and description of those components is omitted. The water treatment device 105 illustrated in FIG. 26 includes a distribution channel 113 and raw water lines 115. The raw water introduction line 112 is connected to the top end of the raw water lines 115 via the distribution channel 113. The raw water lines 115 are lines that extend in the vertical direction, and have a top end positioned above the water surface level inside the reaction tank 110, and a bottom end that is connected to an inflow port 126. In this description, the expression that the lines extend in the vertical direction includes cases where the lines extend in a substantially vertical direction. The expression "substantially vertical direction" includes all directions having an angle of inclination within 30° C. of the vertical direction. The raw water lines 115 may also be provided outside the reaction tank 110. In the water treatment device 105, in a similar manner to that observed in the water treatment device 104 described above, the inflow ports 126 and the discharge port 128 are installed in the same wall surface.

EXAMPLES

The present invention is described below in further detail using a series of examples, but the present invention is not limited to the following examples.

Example 1

Testing was conducted using a reaction tank with an effective capacity of 1.4 m$^3$. As illustrated in FIG. 2(B), two inflow lines were installed on opposite sides of the reaction tank. The inflow ports were openings formed in the inflow lines, with the ports opening toward the center of the reaction tank in a substantially horizontal direction. The area of the opening of each inflow port was 0.15 m$^2$. The discharge port was formed in a side wall of the reaction tank. The position of the discharge port was set at the water surface level inside the reaction tank.

Municipal sewage was used as the wastewater used in testing. The wastewater and an activate sludge were introduced into the reaction tank, and aeration under stirring was conducted for a prescribed time (the biological treatment step). Following the biological treatment step, the reaction tank was left to stand for a prescribed time (the settling step). Following the settling step, the wastewater was supplied to the inflow lines, flowed down through the inflow lines under gravity, and was supplied in a horizontal direction from the inflow ports into the biological sludge bed inside the reaction tank, while the biologically treated water in the reaction tank was discharged from the discharge port (the inflow/discharge step). With the wastewater flow rate set to 8 L/min per inflow line, the flow velocity at each inflow port set to about 3.2 m/h, and the wastewater inflow ratio set to 100%, the above operations were conducted for 200 days.

Further, on day 1, day 31 and day 172 of operation, the biological sludge inside the reaction tank was sampled, and an SVI measurement of the biological sludge was conducted. SVI is an indicator of the biological sludge settling properties, and is determined using the following method. First, 1 L of the sludge is placed in a 1 L measuring cylinder, and following gentle stirring to achieve as uniform a sludge concentration as possible, the sludge interface is measured after standing for 5 minutes and after standing for 30 minutes. The volume fraction (%) occupied by the sludge in the measuring cylinder is then calculated. Next, the sludge MLSS (mg/L) is measured. These values are then applied to the following equation to calculate the SVI5 and SVI30 values.

$$SVI(mL/g) = \text{volume fraction of sludge} \times 10{,}000/MLSS$$

On day 1 of operation, the SVI5 value of the biological sludge was 221 mL/g and the SVI30 value was 96 mL/g, on day 31 of operation, the SVI5 value of the biological sludge was 122 mL/g and the SVI30 value was 67 mL/g, and on day 172, the SVI5 value of the biological sludge was 46 mL/g and the SVI30 value was 36 mL/g. Based on these results, it was evident that a biological sludge of superior settling properties had been obtained using a treatment method in which introduction of the wastewater was conducted without using a pump.

Three months after starting operations, measurement of the BOD concentration of the wastewater prior to introduction into the reaction tank and the BOD concentration of the treated water discharged from the reaction tank revealed a wastewater BOD concentration prior to introduction of 103 mg/L and a treated water BOD concentration of 19 mg/L. In other words, the treated water BOD concentration was about 18% of the wastewater BOD concentration, indicating that the BOD concentration retained inside the reaction tank following the inflow/discharge step was about 82% of the wastewater BOD concentration, and confirming that even in a treatment method in which the wastewater is supplied by gravity, the BOD concentration inside the reaction tank can be increased efficiently.

Example 2

The testing described below was conducted using the reaction tank illustrated in FIG. 23. For the reaction tank, a reaction tank having a length of 146 mm (L), a width of 208 mm (W), a height of 300 mm (effective water depth of 200 mm (H)), and an effective capacity of 6.1 L was used. The partition wall was installed in a position 25 mm removed from a first side surface of the reaction tank, and an inflow port (opening) was provided in the bottom end of the partition wall. The discharge port was provided at the side surface on the opposite side from the first side surface. The position of the discharge port was set at the water surface level inside the reaction tank.

The wastewater used in the testing was a sodium bromide solution (40 mgBr/L). The wastewater and an activated sludge were introduced into the second chamber of the reaction tank, and aeration under stirring was conducted for a prescribed time (the biological treatment step). Following the biological treatment step, the reaction tank was left to stand for a prescribed time (the settling step). Following the settling step, the wastewater was supplied to the first chamber, and the wastewater was then supplied in a horizontal direction from the inflow port into the biological sludge bed inside the second chamber, while the biologically treated water in the second chamber was discharged from the discharge port (the inflow/discharge step). The wastewater flow rate was set to a water area load of 0.6 m/h, and the inflow/discharge step time was set to 32 minutes (a wastewater inflow rate of 150% relative to the water tank effective capacity).

The bromide ion concentration in the reaction tank following the inflow/discharge step was measured, and the following equation was used to evaluate the bromide ion retention ratio inside the reaction tank at the completion of the inflow/discharge step. The result is shown in Table 1. Bromide ions are unlikely to be affected by adsorption to biological sludge or biological reactions, and therefore it can be stated that if the retention ratio of bromide ions in the reaction tank exhibits a high value, the concentration of treatment target substances retained inside the reaction tank will also be high.

Bromide ion retention ratio=(bromide ion concentration in reaction tank/hydrogen ion concentration in wastewater)×100

Comparative Example 1

With the exception of installing a flow distribution plate in the second chamber of the reaction tank, the same reaction tank as Example 2 was used. The flow distribution plate was a 250 cm² rectangular plate (120 mm×208 mm) having a plurality of holes of diameter 4 mm formed across the entire plate. The flow distribution plate was installed horizontally in a position 6 mm above the bottom of the second chamber (a position higher than the inflow port in the partition wall). In other words, the wastewater (sodium bromide solution) flows from the inflow port into a position in the second chamber beneath the flow distribution plate, and is then supplied in an upward flow direction from the holes in the flow distribution plate. Moreover, because the biological sludge bed formed in the settling step is formed on top of the flow distribution plate, the wastewater is supplied from the holes into the biological sludge bed in an upward flow.

In the Comparative Example 1, the bromide ion concentration in the reaction tank following the inflow/discharge step was measured in a similar manner to that described above, and the bromide ion retention ratio inside the reaction tank at the completion of the inflow/discharge step was evaluated. The result is shown in Table 1.

TABLE 1

| | Bromide ion concentration in wastewater | Bromide ion concentration in reaction tank | Bromide ion retention ratio in reaction tank |
|---|---|---|---|
| Example 1 | 38.0 mgBr/L | 31.0 mgBr/L | 82% |
| Comparative Example 1 | 37.3 mgBr/L | 26.0 mgBr/L | 70% |

In Comparative Example 1, the bromide ion retention ratio was 70%, whereas in Example 2, the bromide retention ratio increased to 82%. Based on these results, it can be stated that, compared with the comparative example in which the wastewater was supplied in an upward flow into the biological treatment tank, the example in which the wastewater was supplied in a horizontal direction from the inflow port into the biological treatment tank in the bottom portion of the reaction tank enabled the concentration of the treatment target substances retained in the reaction tank in the inflow/discharge step to be efficiently increased to an equal or higher value.

Example 3 and Example 4

The testing described below was conducted using the reaction tank illustrated in FIG. 22. For the reaction tank, a reaction tank having a length of 438 mm (L), a width of 125 mm (W), a height of 750 mm (effective water depth of 600 mm), and an effective capacity of 33 L was used. The inflow ports were provided in the bottom portion of a side surface of the reaction tank (125×750 side surface). However, in Example 3, the discharge port was provided on the side surface opposite the side surface in which the inflow ports were installed, whereas in Example 4, the discharge port was provided on the same side surface as the side surface in which the inflow ports were installed. The position of the discharge port in Examples 3 and 4 was set at the water surface level inside the reaction tank.

The wastewater used in the testing was a sodium bromide solution (40 mgBr/L). The wastewater and an activated sludge were introduced into the reaction tank, and aeration under stirring was conducted for a prescribed time (the biological treatment step). Following the biological treatment step, the reaction tank was left to stand for a prescribed time (the settling step). Following the settling step, the wastewater was supplied in a horizontal direction through the wastewater inflow ports so as to contact the settled sludge, while the biologically treated water in the reaction tank was discharged from the discharge port (the inflow/discharge step). At this time, the wastewater was supplied while the flow velocity of the wastewater through the inflow ports was varied across a range using the conditions shown in Table 2. The supply volume was set to a volume of 100% relative to the effective capacity of the reaction tank. In the table, N represents the distance N (m) in a horizontal direction from the inflow ports to the side surface of the reaction tank opposing the inflow ports.

TABLE 2

| Conditions | Inflow port flow velocity v cm/sec | $v/N^{1/2}$ (N = 0.438 m) cm/(sec · m$^{1/2}$) |
|---|---|---|
| 1 | 12.8 | 19 |
| 2 | 18.4 | 28 |
| 3 | 28.7 | 43 |
| 4 | 37.8 | 57 |
| 5 | 41.3 | 62 |
| 6 | 51.1 | 77 |

The bromide ion concentration in the reaction tank in the inflow/discharge step was measured, and the above equation was used to evaluate the bromide ion retention ratio inside the reaction tank at the completion of the inflow/discharge step. The results are shown in FIG. 27.

Figure 27:
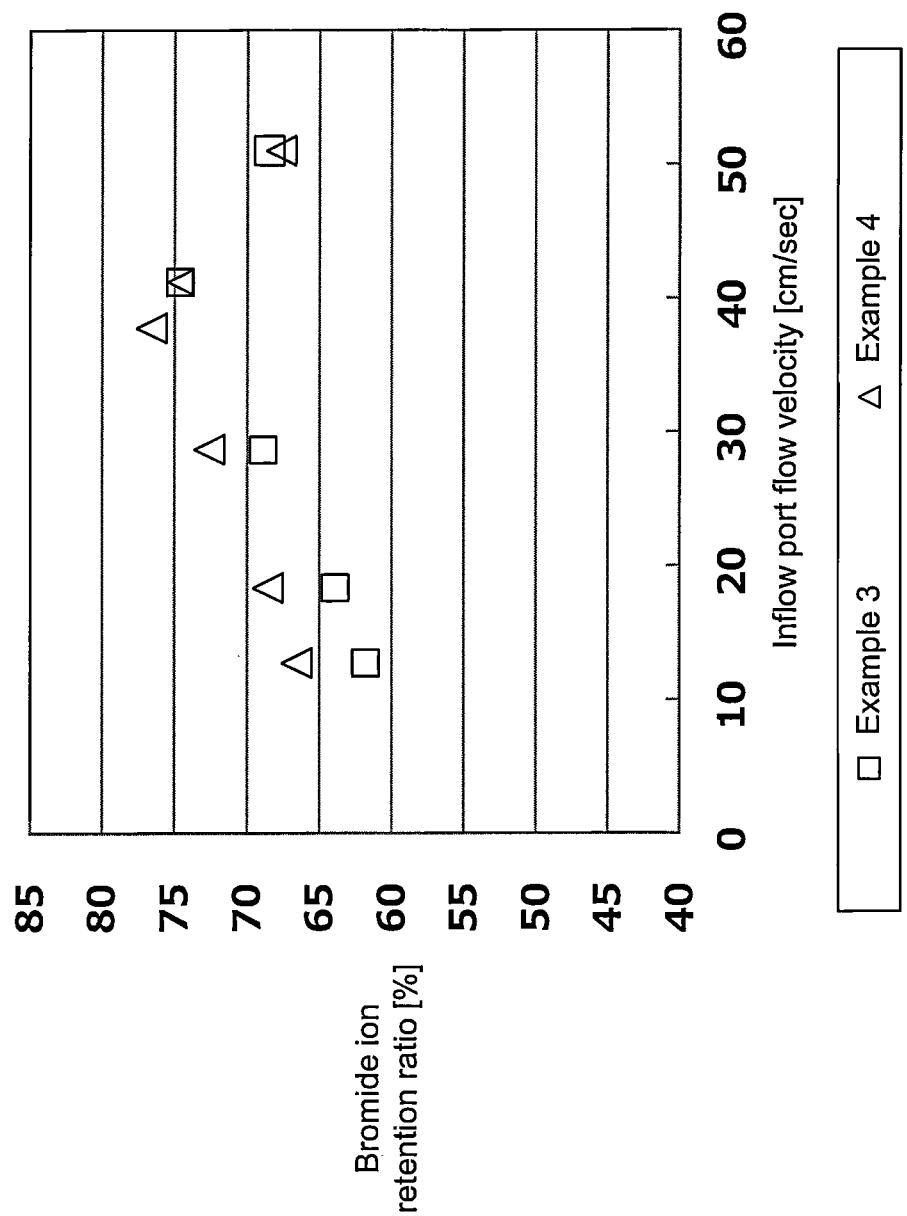
FIG. 27 is a diagram illustrating the results for the bromide ion retention ratio relative to the flow velocity through the inflow port in Examples 2 and 3.

FIG. 27 is a diagram illustrating the results for the bromide ion retention ratio relative to the flow velocity through the inflow ports in Examples 3 and 4. As illustrated in FIG. 27, under any of the conditions, the bromide ion retention ratio was at least 50%. Among the conditions tested, the highest retention ratio was obtained under the conditions when the inflow port flow velocity was 37.8 cm/sec. The above results confirmed that when the inflow port flow velocity v satisfied the range expressed by $[N^{1/2} \times 20] \leq v \leq [N^{1/2} \times 80]$, the retention ratio for treatment target substances in the wastewater during the inflow/discharge step is at least 50%. Further, comparison of the conditions when the inflow ports and the discharge port were installed at either the same side surface or opposing side surfaces of the reaction tank revealed that, in each case, installation at the same surface yielded a higher bromide ion retention ratio, confirming that the wastewater inflow ports and the discharge port are preferably installed at the same side surface.

Example 5

Next, testing was conducted using the reaction tank illustrated in FIG. 25. For the reaction tank, a reaction tank having a length of 3 m, a width of 1 m, an effective water depth of 5 m, and an effective capacity of 15 m³ was used. The inflow ports were installed in the lower portion of a side surface of the reaction tank, and the discharge port was installed at the same side surface as the side surface in which the inflow ports were installed. Further, the position of the discharge port was set at the water surface level inside the reaction tank. With the exception of using the inflow port flow velocity conditions shown in Table 3, the test method was the same as Example 4.

TABLE 3

| Conditions | Inflow port flow velocity v cm/sec | $v/N^{1/2}$ (N = 3 m) cm/(sec · m$^{1/2}$) |
|---|---|---|
| 7 | 68 | 39 |
| 8 | 82 | 47 |
| 9 | 106 | 61 |

The results for the bromide ion retention ratio were 91% under condition 7, 76% under condition 8 and 86% under condition 9, with the retention ratio exceeding 70% in all cases.

Example 6

A granule formation test described below was conducted using the reaction tank illustrated in FIG. 22. For the reaction tank, a reaction tank having a length of 220 mm (L), a width of 125 mm (W), a height of 400 mm (effective water depth of 300 mm), and an effective capacity of 33 L was used. The inflow ports were provided in the bottom portion of a side surface of the reaction tank (125×220 side surface). The discharge port was provided on the side surface opposite the side surface in which the inflow ports were installed. The position of the discharge port was set at the water surface level inside the reaction tank. The N value in this reaction tank was 0.22 m.

The operational steps involved repeating an inflow/discharge step, an aeration step, and a settling step. An activated sludge from a sewage treatment plant was introduced into the reaction tank as the initial sludge, and the changes in the properties of the sludge inside the reaction tank were investigated. A simulated sewage containing a bonito extract and peptone as the main components was used as the inflow water, and the BOD value was adjusted to 100 mg/L. In the inflow/discharge step, the simulated sewage was introduced from the inflow ports installed in the side surface of the reaction tank so as to make contact with the sludge, and the flow velocity through the inflow ports was set within a range from 11 to 28 cm/sec (equivalent to a $v/N^{1/2}$ range of 23.5 to 60). The inflow volume of the wastewater in a single inflow/discharge step was set to 100% relative to the effective capacity of the reaction tank.

Figure 28:
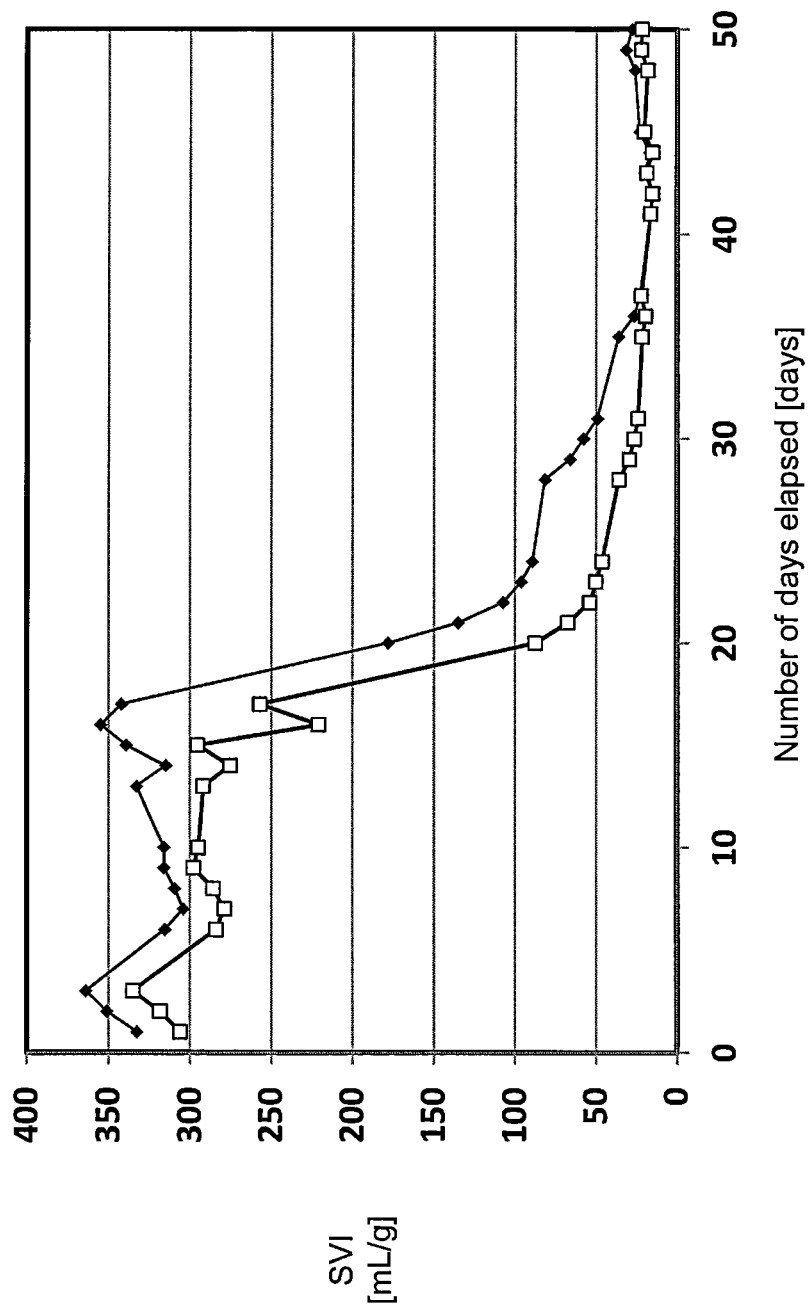
FIG. 28 is a diagram illustrating the transitions for SVI5 and SVI30 which are settling indicators for the reaction tank sludge.

The transitions for SVI5 and SVI30, which are indicators of the settling properties of the reaction tank sludge, are illustrated in FIG. 28. SVI5 is an indicator of the biological sludge settling properties, and is determined using the following method. First, 1 L of the sludge is placed in a 1 L measuring cylinder, and following stirring, the sludge interface is measured after standing for 5 minutes and after standing for 30 minutes. The volume fraction (%) occupied by the sludge in the measuring cylinder is then calculated. Next, the sludge MLSS (mg/L) is measured. These values are then applied to the following equation to calculate SVI5 or SVI30. A smaller value for SVI5 or SVI30 indicates a sludge having superior settling properties.

$SVI$(mL/g)=volume fraction of sludge×10,000/$MLSS$

As illustrated in FIG. 28, in the initial 15-day startup period, no change in the SVI was observed, and both SVI5 and SVI30 varied between 300 and 350 mL/g. Thereafter, a rapid reduction in SVI was confirmed, and by 35 days after startup, SVI5 and SVI30 had both fallen to 20 mL/g, confirming the formation of a sludge having superior settling properties.

Figure 29:
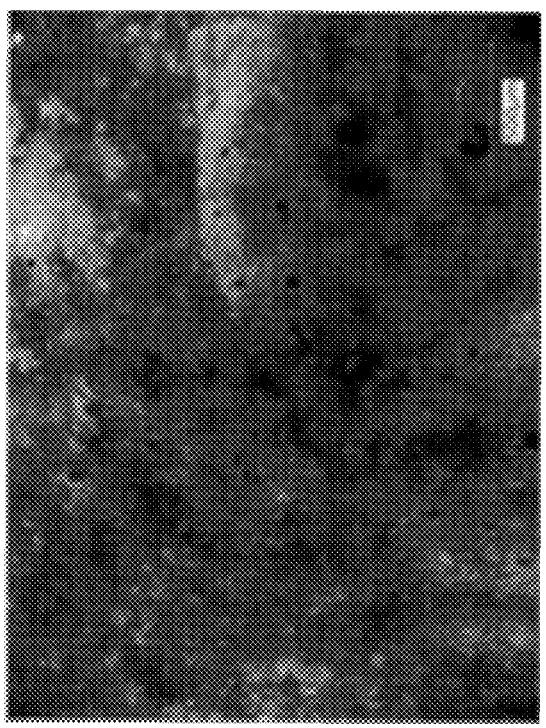
FIG. 29 illustrates photographs of sludge inspection for newly introduced sludge and sludge 50 days after startup.
Figure 29:
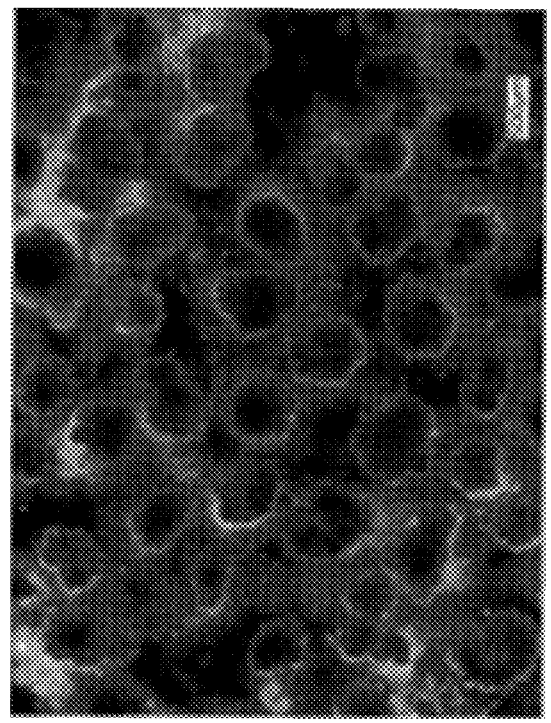

Photographs of sludge inspections of the newly introduced sludge and the sludge 50 days after startup are illustrated in FIG. 29. The bar indicates 500 μm in each case. As illustrated in FIG. 29, whereas the introduced sludge was composed of a dispersed sludge, the sludge after 50 days was composed of a favorable granular sludge with granules of about 200 to 300 μm.

REFERENCE SIGNS LIST 1 to 7: Water treatment device
10: Reaction tank
12, 12a, 12b: Inflow port
14: Inflow line
14a, 22a: Electromagnetic valve
16: Discharge port
17: Partition wall
18: Blower
20: Aeration line
22: Treated water discharge line
24: Control device
30: Biological sludge bed
32: Treated water collection channel
34, 42a, 42b: Raw water introduction line
34a: Electromagnetic valve
36: Wastewater inflow trough
38: Treated water collection trough
40: Continuous biological treatment tank
44: Treated water supply line
44a, 46a: Valve
46: Biological sludge supply line
48: Treated water discharge line
101 to 105: Water treatment device
110: Reaction tank
110a, 110b: Long side wall
110c, 110d: Short side wall
110f: First chamber
110g: Second chamber
112: Raw water introduction line
113: Distribution channel
114: Raw water pump
115: Raw water line
116: Electromagnetic valve
117: Partition wall
118: Blower
120: Aeration line
122: Treated water collection channel
124: Control device
126: Inflow port
128: Discharge port
130: Biological sludge bed

The invention claimed is:

1. A water treatment method that uses a reaction tank in which an operational cycle is performed repeatedly, the operational cycle having introducing a wastewater, biologically treating the wastewater with a biological sludge, the biological sludge to settle, and discharging a biologically treated water that has undergone the biological treatment, wherein
the reaction tank is provided with at least two inflow ports, where each inflow port of the at least two inflow ports
is disposed at a position lower than an interface position of a biological sludge bed formed in a bottom portion of the reaction tank during the allowing to settle, and
has a corresponding inflow section that extends upward in a vertical direction from the respective inflow port such that the reaction tank is provided with at least two inflow sections;
neither of the at least two inflow sections runs to the bottom of the reaction tank; and
in the introducing, the wastewater flows down inside the at least two inflow sections due to gravity and is supplied into the biological sludge bed from the at least two inflow ports, wherein an opening of each inflow port of the at least two inflow ports is arranged in the corresponding inflow section such that the wastewater that is supplied from each inflow port of the at least two inflow ports is directed into the biological sludge bed in the same direction.

2. The water treatment method according to claim 1, wherein in the operational cycle, the discharging is conducted while the introducing.

3. The water treatment method according to claim 1, wherein the method also comprises at least one of supplying the biological sludge inside the reaction tank, and supplying the biologically treated water inside the reaction tank, to a continuous biological treatment tank which conducts a biological treatment with a biological sludge while receiving continuous inflow from at least one wastewater source.

4. The water treatment method according to claim 1, wherein in the introducing, the wastewater that is supplied in the same direction from each inflow port of the at least two inflow ports is directed into the biological sludge bed in either a horizontal direction or a direction below horizontal.

5. The water treatment method according to claim 1, wherein
in the operational cycle, the discharging is conducted while the introducing,
the reaction tank is provided with a discharge port disposed at a water surface level inside the reaction tank, and
the wastewater that is supplied in the same direction from each inflow port of the at least two inflow ports is directed into the biological sludge bed in a horizontal direction.

6. The water treatment method according to claim 5, wherein the reaction tank is a rectangular water tank, and the at least two inflow ports and the discharge port are provided at the same sidewall of the rectangular water tank.

7. The water treatment method according to claim 5, wherein a flow velocity v (cm/sec) of wastewater through the at least two inflow ports and a distance N (m) in a horizontal direction from the at least two inflow ports to a side surface of the reaction tank opposing the at least two inflow ports satisfies an equation shown below:

$$20 \text{ cm}/(\text{sec}\cdot\text{m}^{1/2}) \leq v/N^{1/2} \leq 80 \text{ cm}/(\text{sec}\cdot\text{m}^{1/2}).$$

8. A water treatment device comprising a reaction tank configured to repeatedly perform an operational cycle, the operational cycle comprising introducing a wastewater, biologically treating the wastewater with a biological sludge, allowing the biological sludge to settle, and discharging a biologically treated water that has undergone the biological treatment, wherein
the reaction tank is provided with at least two inflow ports, where each inflow port of the at least two inflow ports
is disposed at a position lower than an interface position of a biological sludge bed formed in a bottom portion of the reaction tank during the allowing to settle, and has a corresponding inflow section that extends upward in a vertical direction from the respective inflow port such that the reaction tank is provided with at least two inflow sections;

neither of the at least two inflow sections runs to the bottom of the reaction tank; and the reaction tank is configured such that in the introducing, the wastewater flows down inside the at least two inflow sections due to gravity and is supplied into the biological sludge bed from the at least two inflow ports, wherein an opening of each inflow port of the at least two inflow ports is arranged in the corresponding inflow section such that the wastewater that is supplied from each inflow port of the at least two inflow ports is directed into the biological sludge bed in the same direction.

9. The water treatment device according to claim 8, wherein the reaction tank is configured such that in the operational cycle, the discharging is conducted while the introducing is occurring.

10. The water treatment device according to claim 8, further comprising at least one of a sludge supply section for supplying the biological sludge inside the reaction tank, and a treated water supply section for supplying the biologically treated water inside the reaction tank, to a continuous biological treatment tank which conducts a biological treatment with a biological sludge while receiving continuous inflow of a wastewater.

11. The water treatment device according to claim 8, wherein the opening of each inflow port of the at least two inflow ports opens in either a horizontal direction or a direction below horizontal.

12. The water treatment device according to claim 8, wherein in the operational cycle, the reaction tank is configured such that the discharging is conducted while conducting the introducing, the reaction tank comprises a discharge port, wherein the discharge port is installed at a location that defines a water surface level inside the reaction tank, and the opening of each inflow port of the at least two inflow ports opens in a horizontal direction.

13. The water treatment device according to claim 12, wherein the reaction tank is a rectangular water tank, and the at least two inflow ports and the discharge port are provided at the same sidewall of the rectangular water tank.

14. The water treatment device according to claim 12, wherein the water treatment device is configured such that a flow velocity v (cm/sec) of wastewater through the at least two inflow ports and a distance N (m) in a horizontal direction from the at least two inflow ports to a side surface of the reaction tank opposing the at least two inflow ports satisfies an equation shown below:

$$20 \text{ cm}/(\text{sec} \cdot \text{m}^{1/2}) \leq v/N^{1/2} \leq 80 \text{ cm}/(\text{sec} \cdot \text{m}^{1/2}).$$

* * * * *